US011973667B2

(12) United States Patent
Hwang

(10) Patent No.: US 11,973,667 B2
(45) Date of Patent: Apr. 30, 2024

(54) DATA TRANSMISSION PROCESSING NETWORKING METHOD AND APPARATUS IN A HOST SUPPORTING QUALITY ASSURANCE OF HYPER-PRECISION COMMUNICATION SERVICES

(71) Applicant: ELECTRONICS AND TELECOMMUNICATIONS RESEARCH INSTITUTE, Daejeon (KR)

(72) Inventor: Jung-Yeon Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/128,340

(22) Filed: Mar. 30, 2023

(65) Prior Publication Data
US 2024/0048461 A1 Feb. 8, 2024

(30) Foreign Application Priority Data
Aug. 3, 2022 (KR) .................. 10-2022-0096470

(51) Int. Cl.
*H04L 41/5019* (2022.01)
*H04L 41/5009* (2022.01)

(52) U.S. Cl.
CPC ...... *H04L 41/5019* (2013.01); *H04L 41/5009* (2013.01)

(58) Field of Classification Search
CPC .................. H04L 41/5019; H04L 41/5009
USPC ........................................... 709/223
See application file for complete search history.

(56) References Cited

U.S. PATENT DOCUMENTS

| 7,058,431 | B2 | 6/2006 | Sasaki | |
|---|---|---|---|---|
| 9,967,197 | B2 * | 5/2018 | Haran | ............... H04L 47/35 |
| 10,230,645 | B1 * | 3/2019 | Kalkunte | ............ H04L 47/215 |
| 2015/0341380 | A1 | 11/2015 | Heo et al. | |
| 2020/0125390 | A1 | 4/2020 | Kim | |
| 2022/0124588 | A1 * | 4/2022 | Zhu | ............... H04W 36/22 |

FOREIGN PATENT DOCUMENTS

KR 10-2006-0054458 A 5/2006
KR 10-2179769 B1 11/2020

\* cited by examiner

*Primary Examiner* — Hermon Asres
(74) *Attorney, Agent, or Firm* — LRK PATENT LAW FIRM

(57) ABSTRACT

Provided are a networking system for data transmission in a host supporting quality assurance of hyper-precision communication services (HPSs), and more particularly, to a networking method and apparatus in a host of a networking system supporting quality assurance of HPSs. The networking method includes receiving a request for an HPS from a client, checking a descriptor of the HPS in a quality-of-service (QoS) profile of the HPS requested by the client, applying a performance parameter, and selecting an optimal algorithm suitable for a type of the HPS requested by the client.

13 Claims, 22 Drawing Sheets

Fig.3a

| Profile | Performance parameter (KPI) | | | |
|---|---|---|---|---|
| | Communication service availability | Communication service Reliability: mean time between failures (MTBF) | Max Allowed End-to-end latency | Service bit rate: user-experienced data rate |
| Remarks | | | | |
| Mobile robots - video streaming | > 99.9999% | ~ 1 week | 10 ms | UL > 10 Mbit/s |
| Mobile control panels parallel data transmission | 99.9999% to 99.999999% | ~ 1 month | < 30 ms | > 5 Mbit/s |
| Mobile Operation Panel: Emergency stop (emergency stop events) | 99.999999% | 1 day | < 8 ms | 250 kbit/s |
| Smart grid millisecond level Precise Load control | 99.9999% | - | < 50 ms | 0.59 kbit/s 28 kbit/s |
| Augmented reality: bi-directional transmission to image processing server | > 99.9% | ~ 1 month | < 10 ms | |
| Wired-2-wireless 100 Mbit/s link replacement | 99.9999% to 99.999999% | ~ 10 years | < 1 ms | 25 Mbit/s |
| Wired-2-wireless 1 Gbit/s link replacement | 99.9999% to 99.999999% | ~ 10 years | < 1 ms | 500 Mbit/s |

Fig.3b

| User application | Performance parameter (KPI) | | | Performance parameter (KPI) | |
|---|---|---|---|---|---|
| | End-to-end latency | Image recognition latency | Intermediate data uploading latency | A cloud | B cloud |
| One-shot object recognition at smartphone | Several seconds | ~1s | ~100ms | 1.6~21.6Mbit/s | 8~240Mbit/s |
| Person identification in security surveillance system | Several seconds | ~1s | ~100ms | 1.6~21.6Mbit/s | 8~240Mbit/s |
| Photo enhancements at smartphone | Several seconds | ~1s | ~100ms | 1.6~21.6Mbit/s | 8~240Mbit/s |
| Video recognition | Several seconds | 33ms@30FPS | ~10ms | 16~216Mbit/s | 80Mbit/s~2.4Gbit/s |
| AR display/gaming | 7~15ms (MTP) | <5ms | 2ms | 80Mbit/s~1.08Gbit/s | 0.4~12Gbit/s |
| Remote driving | 10ms | <5ms | 2ms | 80Mbit/s~1.08Gbit/s | 0.4~12Gbit/s |
| Remote-controlled robotics | 10~100ms | <5ms | 2ms | 80Mbit/s~1.08Gbit/s | 0.4~12Gbit/s |

Fig.10

| | 3D Cam Stream #2 (BE) | | | | 3D Cam Stream#2 (MQPRIO) | | | | 3D Cam Stream#2 (CBS) | | | | 3D Cam Stream #2 (TAPRIO) | | | |
|---|---|---|---|---|---|---|---|---|---|---|---|---|---|---|---|---|
| | Bandwidth | Latency | Jitter | Packet Loss | Bandwidth | Latency | Jitter | Packet Loss | Bandwidth | Latency | Jitter | Packet Loss | Bandwidth | Latency | Jitter | Packet Loss |
| 1 | 8.80 | 190 | 37 | 291 | 8.80 | 180.92 | 33.45 | 0 | 8.80 | 180.12 | 33.46 | 2.00 | 8.80 | 182.62 | 33.45 | 0 |
| 2 | 8.80 | 189 | 36 | 176 | 8.80 | 180.27 | 33.46 | 1 | 8.80 | 180.99 | 33.47 | 2.00 | 8.80 | 180.70 | 33.45 | 1 |
| 3 | 8.80 | 189 | 36 | 259 | 8.80 | 180.26 | 33.44 | 0 | 8.80 | 180.07 | 33.45 | 0.00 | 8.80 | 181.12 | 33.44 | 0 |
| 4 | 8.80 | 190 | 37 | 297 | 8.80 | 180.50 | 33.44 | 0 | 8.80 | 180.43 | 33.45 | 0.00 | 8.80 | 181.80 | 33.46 | 2 |
| 5 | 8.80 | 191 | 38 | 397 | 8.80 | 180.18 | 33.44 | 0 | 8.80 | 180.81 | 33.45 | 1.00 | 8.80 | 180.26 | 33.47 | 3 |
| 6 | 8.80 | 190 | 37 | 340 | 8.80 | 180.41 | 33.45 | 0 | 8.80 | 180.06 | 33.45 | 0.00 | 8.80 | 180.33 | 33.46 | 2 |
| 7 | 8.80 | 190 | 37 | 314 | 8.80 | 180.37 | 33.44 | 0 | 8.80 | 180.60 | 33.44 | 0.00 | 8.80 | 180.13 | 33.47 | 2 |
| 8 | 8.80 | 190 | 37 | 350 | 8.80 | 180.42 | 33.45 | 0 | 8.80 | 180.05 | 33.45 | 0.00 | 8.80 | 180.44 | 33.46 | 2 |
| 9 | 8.80 | 190 | 37 | 326 | 8.80 | 180.88 | 33.44 | 0 | 8.80 | 179.98 | 33.45 | 0.00 | 8.80 | 182.70 | 33.45 | 1 |
| 10 | 8.80 | 191 | 38 | 416 | 8.80 | 180.51 | 33.45 | 0 | 8.80 | 180.08 | 33.44 | 0.00 | 8.80 | 180.60 | 33.47 | 3 |

Fig.11a

| | | REPETITION OF EXPERIMENT | SUM | MEAN |
|---|---|---|---|---|
| LEVEL OF FACTOR | $A_1$ | $X_{11}$  $X_{12}$  $\cdots$  $X_{1r}$ | $T_1$ | $\bar{X}_1$ |
| | $A_2$ | $X_{21}$  $X_{22}$  $\cdots$  $X_{2r}$ | $T_2$ | $\bar{X}_2$ |
| | $\vdots$ | $\vdots$ | $\vdots$ | $\vdots$ |
| | $A_a$ | $X_{a1}$  $X_{a2}$  $\cdots$  $X_{ar}$ | $T_a$ | $\bar{X}_a$ |
| | | | $T$ | $\bar{X}$ |

Fig.11b

| | SUM OF SQUARES | DEGREE OF FREEDOM | MEAN SQUARE | F-VALUE |
|---|---|---|---|---|
| FACTOR (A) | SSA | $a-1$ | MSA | MSA/MSE |
| BASE NUMBER (B) | SSE | $a(r-1)$ | MSE | |
| TOTAL (T) | SST | $ar-1$ | | |

Fig.12a

| | N | RANGE | MINIMUM VALUE | MAXIMUM VALUE | MEAN | STANDARD VARIANCE | DISPERSION | SKEWNESS | | KURTOSIS | |
|---|---|---|---|---|---|---|---|---|---|---|---|
| | STATISTICS | STATISTICS | STATISTICS | STATISTICS | STATISTICS | STATISTICS | STATISTICS | STATISTICS | STANDARD ERROR | STATISTICS | STANDARD ERROR |
| Latency | 40 | 11.02 | 179.98 | 191.00 | 182.9653 | 4.16695 | 17.363 | 1.157 | .374 | -.576 | .733 |
| Jitter | 40 | 4.56 | 33.44 | 38.00 | 34.3388 | 1.58868 | 2.524 | 1.343 | .374 | .014 | .733 |
| PackLoss | 40 | 416.00 | .00 | 416.00 | 79.7000 | 142.37423 | 20270.421 | 1.372 | .374 | .107 | .733 |
| EFFECTIVE VALUE (OF EACH LIST) | 40 | | | | | | | | | | |

Fig.12b

|  | FREQUENCY | PERCENTAGE | EFFECTIVE PERCENTAGE | CUMULATIVE PERCENTAGE |
|---|---|---|---|---|
| EFFECTIVE BEST EFFORT | 10 | 25.0 | 25.0 | 25.0 |
| CBS | 10 | 25.0 | 25.0 | 50.0 |
| MQPRIO | 10 | 25.0 | 25.0 | 75.0 |
| TAPRIO | 10 | 25.0 | 25.0 | 100.0 |
| TOTAL | 40 | 100.0 | 100.0 | |

Fig.13a

| | | N | MEAN | STANDARD VARIANCE | STANDARD ERROR | 95% CONFIDENCE INTERVAL FOR MEANS | | MINIMUM VALUE | MAXIMUM VALUE |
|---|---|---|---|---|---|---|---|---|---|
| | | | | | | LOWER LIMIT VALUE | UPPER LIMIT VALUE | | |
| Latency | 1 | 10 | 190.0000 | .66667 | .21082 | 189.5231 | 190.4769 | 189.00 | 191.00 |
| | 2 | 10 | 180.4720 | .24886 | .07869 | 180.2940 | 180.6500 | 180.18 | 180.92 |
| | 3 | 10 | 180.3190 | .36449 | .11526 | 180.0583 | 180.5797 | 179.98 | 180.99 |
| | 4 | 10 | 181.0700 | .96821 | .30617 | 180.3774 | 181.7626 | 180.13 | 182.70 |
| | TOTAL | 40 | 182.9653 | 4.16695 | .65885 | 181.6326 | 184.2979 | 179.98 | 191.00 |
| Jitter | 1 | 10 | 37.0000 | .66667 | .21082 | 36.5231 | 37.4769 | 36.00 | 38.00 |
| | 2 | 10 | 33.4460 | .00699 | .00221 | 33.4410 | 33.4510 | 33.44 | 33.46 |
| | 3 | 10 | 33.4510 | .00876 | .00277 | 33.4447 | 33.4573 | 33.44 | 33.47 |
| | 4 | 10 | 33.4580 | .01033 | .00327 | 33.4506 | 33.4654 | 33.44 | 33.47 |
| | TOTAL | 40 | 34.3388 | 1.58868 | .25119 | 33.8307 | 34.8468 | 33.44 | 38.00 |
| PackLoss | 1 | 10 | 316.6000 | 68.49850 | 21.66113 | 267.5991 | 365.6009 | 176.00 | 416.00 |
| | 2 | 10 | .1000 | .31623 | .10000 | -.1262 | .3262 | .00 | 1.00 |
| | 3 | 10 | .5000 | .84984 | .26874 | -.1079 | 1.1079 | .00 | 2.00 |
| | 4 | 10 | 1.6000 | 1.07497 | .33993 | .8310 | 2.3690 | .00 | 3.00 |
| | TOTAL | 40 | 79.7000 | 142.37423 | 22.51134 | 34.1665 | 125.2335 | .00 | 416.00 |

Fig.13b

| | | N | MEAN | STANDARD VARIANCE | STANDARD ERROR | LOWER LIMIT VALUE |
|---|---|---|---|---|---|---|
| Latency | INTER-GROUP | 662.986 | 3 | 220.995 | 560.671 | .000 |
| | IN-GROUP | 14.190 | 36 | .394 | | |
| | TOTAL | 677.176 | 39 | | | |
| Jitter | INTER-GROUP | 94.431 | 3 | 31.477 | 283.144 | .000 |
| | IN-GROUP | 4.002 | 36 | .111 | | |
| | TOTAL | 98.433 | 39 | | | |
| PackLoss | INTER-GROUP | 748300.200 | 3 | 249433.400 | 212.554 | .000 |
| | IN-GROUP | 42246.200 | 36 | 1173.506 | | |
| | TOTAL | 790546.400 | 39 | | | |

MULTIPLE COMPARISON

Latency
LSD

| (I)Protocol1 | (J)Protocol1 | MEAN DIFFERENCE (I-J) | STANDARD ERROR | SIGNIFICANCE PROBABILITY | 95% CONFIDENCE INTERVAL | |
|---|---|---|---|---|---|---|
| | | | | | LOWER LIMIT VALUE | UPPER LIMIT VALUE |
| 1 | 2 | 9.52800* | .28077 | .000 | 8.9586 | 10.0974 |
| | 3 | 9.68100* | .28077 | .000 | 9.1116 | 10.2504 |
| | 4 | 8.93000* | .28077 | .000 | 8.3606 | 9.4994 |
| 2 | 1 | -9.52800* | .28077 | .000 | -10.0974 | -8.9586 |
| | 3 | .15300 | .28077 | .589 | -.4184 | .7224 |
| | 4 | -.59800* | .28077 | .040 | -1.1674 | -.0286 |
| 3 | 1 | -9.68100* | .28077 | .000 | -10.2504 | -9.1116 |
| | 2 | -.15300 | .28077 | .589 | -.7224 | .4164 |
| | 4 | -.75100* | .28077 | .011 | -1.3204 | -.1816 |
| 4 | 1 | -8.93000* | .28077 | .000 | -9.4994 | -8.3606 |
| | 2 | .59800* | .28077 | .040 | .0286 | 1.1674 |
| | 3 | .75100* | .28077 | .011 | .1816 | 1.3204 |

*. MEAN DIFFERENCE IS SIGNIFICANT WITHIN RANGE OF 0.05

MULTIPLE COMPARISON

Jitter
LSD

| (I)Protocol1 | (J)Protocol1 | MEAN DIFFERENCE (I-J) | STANDARD ERROR | SIGNIFICANCE PROBABILITY | 95% CONFIDENCE INTERVAL | |
|---|---|---|---|---|---|---|
| | | | | | LOWER LIMIT VALUE | UPPER LIMIT VALUE |
| 1 | 2 | 3.55400* | .14911 | .000 | 3.2516 | 3.8564 |
| | 3 | 3.54900* | .14911 | .000 | 3.2466 | 3.8514 |
| | 4 | 3.54200* | .14911 | .000 | 3.2396 | 3.8444 |
| 2 | 1 | -3.55400* | .14911 | .000 | -3.8564 | -3.2516 |
| | 3 | -.00500 | .14911 | .973 | -.3074 | .2974 |
| | 4 | -.01200 | .14911 | .936 | -.3144 | .2904 |
| 3 | 1 | -3.54900* | .14911 | .000 | -3.8514 | -3.2466 |
| | 2 | .00500 | .14911 | .973 | -.2974 | .3074 |
| | 4 | -.00700 | .14911 | .963 | -.3094 | .2954 |
| 4 | 1 | -3.54200* | .14911 | .000 | -3.8444 | -3.2396 |
| | 2 | .01200 | .14911 | .936 | -.2904 | .3144 |
| | 3 | .00700 | .14911 | .963 | -.2954 | .3094 |

*. MEAN DIFFERENCE IS SIGNIFICANT WITHIN RANGE OF 0.05

MULTIPLE COMPARISON

PackLoss
LSD

| (I)Protocol1 | (J)Protocol1 | MEAN DIFFERENCE (I-J) | STANDARD ERROR | SIGNIFICANCE PROBABILITY | 95% CONFIDENCE INTERVAL | |
|---|---|---|---|---|---|---|
| | | | | | LOWER LIMIT VALUE | UPPER LIMIT VALUE |
| 1 | 2 | 316.50000* | 15.31996 | .000 | 285.4297 | 347.5703 |
| | 3 | 316.10000* | 15.31996 | .000 | 285.0297 | 347.1703 |
| | 4 | 315.00000* | 15.31996 | .000 | 283.9297 | 346.0703 |
| 2 | 1 | -316.50000* | 15.31996 | .000 | -347.5703 | -285.4297 |
| | 3 | -.40000 | 15.31996 | .979 | -31.4703 | 30.6703 |
| | 4 | -1.50000 | 15.31996 | .923 | -32.5703 | 29.5703 |
| 3 | 1 | -316.10000* | 15.31996 | .000 | -347.1703 | -285.0297 |
| | 2 | .40000 | 15.31996 | .979 | -30.6703 | 31.4703 |
| | 4 | -1.10000 | 15.31996 | .943 | -32.1703 | 29.9703 |
| 4 | 1 | -315.00000* | 15.31996 | .000 | -346.0703 | -283.9297 |
| | 2 | 1.50000 | 15.31996 | .923 | -29.5703 | 32.5703 |
| | 3 | 1.10000 | 15.31996 | .943 | -29.9703 | 32.1703 |

*. MEAN DIFFERENCE IS SIGNIFICANT WITHIN RANGE OF 0.05

DATA TRANSMISSION PROCESSING NETWORKING METHOD AND APPARATUS IN A HOST SUPPORTING QUALITY ASSURANCE OF HYPER-PRECISION COMMUNICATION SERVICES

CROSS-REFERENCE TO RELATED APPLICATION

This application claims priority to and the benefit of Korean Patent Application No. 10-2022-0096470, filed on Aug. 3, 2022, the disclosure of which is incorporated herein by reference in its entirety.

BACKGROUND

1. Field of the Invention

The present disclosure relates to a networking system supporting quality assurance of 5G-Advanced and 6G infra-based hyper-precision communication services (HPSs), and more particularly, to a networking method and apparatus in a host supporting quality assurance of an HPS in a networking system.

2. Description of Related Art

Generally, a delay and latency may increase during the transmission of packets through transmission control protocol/Internet protocol (TCP/IP) when a hyper-precision communication service (HPS) is provided through a user (or client) device and a communication service server. In particular, in order to transmit packets of an HPS requiring a high bandwidth and a low latency, a delay and latency may increase greatly due to a delay in a network processing rate, a high latency, and a low network processing rate during the transmission of the packets through a communication service to a client using a high bandwidth, thus resulting in the deterioration of the quality of the HPS.

SUMMARY OF THE INVENTION

The present disclosure is directed to providing a method and an apparatus for securing the quality of communication that a user desires when a hyper-precision communication service (HPS) is provided.

The present disclosure is also directed to providing a method and apparatus for fixing the degradation in quality caused by a delay and latency when an HPS is provided.

The present disclosure is also directed to providing a method and apparatus for minimizing a delay and latency in the transmission of packets required for the type of an HPS to be provided to a user by a user device or server of the HPS.

The present disclosure is also directed to providing a method and apparatus for securing the quality in processing of an operating system (OS) of a user device or local server by applying a descriptor of a quality-of-service (QoS) profile according to the type of an HPS requested by a user in advance and selectively applying an optimal algorithm for the transmission of streaming data in a host for the HPS according to the type of the HPS to minimize a delay and latency in the HPS.

According to an embodiment of the present disclosure, a networking method in a host supporting quality assurance of an HPS includes receiving a request for an HPS from a client, checking a descriptor of the HPS in a quality-of-service (QoS) profile of the HPS requested by the client and applying a performance parameter, and selecting an optimal algorithm suitable for the type of the HPS requested by the client. The method may further include transmitting data through a user datagram protocol (UDP) and processing the data through socket communication using a kernel.

According to an embodiment of the present disclosure, in the networking method, the QoS file may include a key performance indicator (KPI) required for the HPS.

According to an embodiment of the present disclosure, in the networking method, the KPI required for the HPS may include at least one of a mean time between failures (MTBF), an end-to-end latency, service availability, a transmission bandwidth, a bandwidth bit rate, or a message size.

According to an embodiment of the present disclosure, in the networking method, the optimal algorithm may be a queue discipline (Qdisc) algorithm, and the Qdisc algorithm may include PRIO, CBS, MQPRIO, TAPRIO, and TAPRIO+ETF.

According to an embodiment of the present disclosure, the networking method may further include selecting an algorithm suitable for the type of the HPS requested by the client from among PRIO, CBS, MQPRIO, TAPRIO, and TAPRIO+ETF, and transmitting the HPS to the client after applying a bandwidth assigned according to a type of the client.

According to an embodiment of the present disclosure, in the networking method, socket communication using a kernel may be used.

According to an embodiment of the present disclosure, in the networking method, a UDP may be applied for the transmission of data.

According to an embodiment of the present disclosure, a networking apparatus in a host supporting quality assurance of an HPS includes a processor, and a memory storing at least one instruction to be executed by the processor, wherein, upon receiving a request for an HPS from a client, the processor checks a quality-of-service (QoS) profile according to a type of the client, checks a descriptor of the HPS, applies a performance parameter, and selects an optimal algorithm suitable for a type of the HPS requested by the client.

According to an embodiment of the present disclosure, in a data transmission (networking) apparatus, the QoS profile according to the type of the client may include a key performance indicator (KPI) required for the HPS.

According to an embodiment of the present disclosure, in the networking apparatus, the KPI may include at least one of an MTBF, an end-to-end latency, service availability, a bandwidth bit rate, or a message size.

According to an embodiment of the present disclosure, in the networking apparatus, the optimal algorithm performed by the processor may be a Qdisc algorithm, and the Qdisc algorithm may include PRIO, CBS, MQPRIO, TAPRIO, and TAPRIO+ETF.

According to an embodiment of the present disclosure, the networking apparatus may further include a network transmission device. Here, when the processor selects and executes an algorithm suitable for the type of the UPS requested by the client from among PRIO, CBS, MQPRIO, TAPRIO, and TAPRIO+ETF, the network transmission device may transmit the HPS to the client after applying a bandwidth assigned according to a type of the client.

According to an embodiment of the present disclosure, the networking apparatus may further include a socket communication means using a kernel.

According to an embodiment of the present disclosure, the networking apparatus may further include a UDP for data transmission.

According to an embodiment of the present disclosure, a networking system supporting quality assurance of an HPS includes a first edge node connected to a client, and a second edge node configured to provide content. Here, upon receiving a request for an HPS from a client, the first edge node may check a descriptor of the HPS in a QoS profile according to a type of the client, apply a performance parameter, and select an optimal algorithm suitable for a type of the HPS requested by the client. Upon receiving the request for the HPS from the first edge, the second edge node may check a descriptor of the HPS in a QoS profile according to the type of the HPS, apply a performance parameter, selects an optimal algorithm suitable for the type of the HPS, and transmit content requested through the HPS to the first edge node after applying the performance parameter.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 3A and 3B are diagrams illustrating examples of performance requirements according to the type of an HPS according to an embodiment of the present disclosure;

FIGS. 9 and 10 are diagrams illustrating a test environment configuration of an inter-algorithm performance analysis according to an embodiment of the present disclosure, and result data of a performance test;

FIGS. 11A-11B, 12A-12B, 13A-13B, 14A-14B, 15A-15B, and 16A-16B are diagrams illustrating a one-way ANOVA method of a design of experiments (DoE) using data of a performance test conducted on Qdisc algorithms according to an embodiment of the present disclosure;

DETAILED DESCRIPTION OF EXEMPLARY EMBODIMENTS

Figure 1:
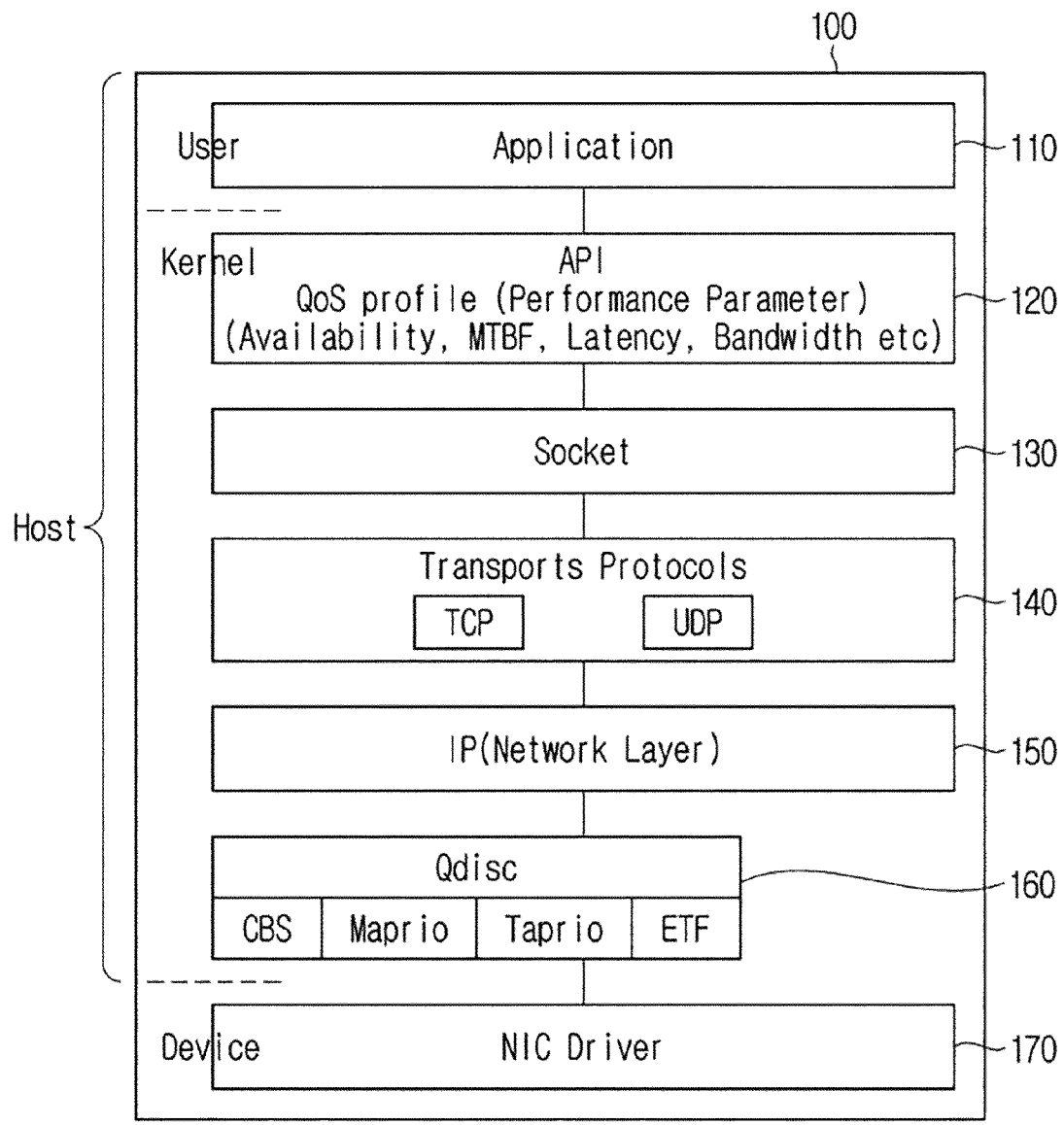
FIG. 1 is a diagram for describing a host device that performs a networking method in a host for the transmission of content of a hyper-precision communication service (HPS) according to an embodiment of the present disclosure.

Hereinafter, embodiments of the present disclosure will be described in detail with reference to the accompanying drawings so that the embodiments may be easily implemented by those of ordinary skill in the art. However, the present disclosure may be embodied in many different forms and is not limited to the example embodiments of the present disclosure set forth herein.

In the following description of embodiments of the present disclosure, well-known configurations or functions are not described in detail when it is determined that they would obscure the present disclosure due to unnecessary detail. In the drawings, parts that are not related to description of the present disclosure are omitted and like reference numerals are assigned to like components.

In the present disclosure, it will be understood that when a component is referred to as being "coupled to," "combined with," or "connected to" another component, the component may be coupled to, combined with or connected to another component directly or indirectly with another component therebetween. It will be understood that when a component is referred to as "including" or "having" another element, the presence of other components is not excluded and the element may further include other elements unless described otherwise.

In the present disclosure, terms such as "first" and "second" are used only for the purpose of distinguishing one component from other components and do not limit an order between the components, the importance of the components, or the like unless specifically stated. Therefore, a first component in an embodiment could be termed a second component in another embodiment, and similarly, a second component in an embodiment could be termed a first component in another embodiment without departing from the scope of the present disclosure.

In the present disclosure, it will be understood that components are described as being distinguished from each other only for the purpose of clearly describing features thereof, and are not necessarily separated from each other. That is, a plurality of components may be integrated into one hardware or software unit or one component may be distributed in hardware or software units. Thus, it should be understood that embodiments in which components are integrated into one hardware or software unit or one component is distributed in hardware or software units are included in the scope of the present disclosure although not described separately.

In the present disclosure, it should be understood that components described in various embodiments are not necessarily indispensable components and some may be optional components. Therefore, an embodiment consisting of a subset of components described in an embodiment is included in the scope of the present disclosure. In addition, an embodiment further including other components in addition to components described in various embodiments is also included in the scope of the present disclosure.

Advantages and features of the present disclosure and methods of achieving them will be apparent from embodiments of the disclosure described in detail, in conjunction with the accompanying drawings. However, the present disclosure is not limited to the embodiments below and may be embodied in many different forms. Rather, the embodiments of the present disclosure are provided so that this disclosure will be thorough and complete and will fully convey the concept of the present disclosure to those of ordinary skill in the art.

Hereinafter, embodiments of the present disclosure will be described with reference to FIGS. 1 to 16B.

FIG. 1 is a diagram illustrating a structure of transmitting data of a hyper-precision communication service (HPS) by a user server according to the present disclosure. FIG. 1 is a block diagram of an embodiment of the present disclosure.

In this regard, an embodiment of the present disclosure provides a technique for providing a hyper-precision communication service (HPS), which is requested by a user, by a client device (a human machine interface (HMI), e.g., a head mounted display (HMD)) or a client server, using an infrastructure owing to the development of 5G-Advanced and 6G according to a delay, a latency, and a bandwidth to secure the quality of the HPS. The present disclosure also provides a method of reducing a latency in the transmission of packets to provide a user with an HPS or a method and apparatus for providing in-time/on-time HPS for quality assurance.

For example, FIG. 1 illustrates a networking apparatus 100 for performing a computing method of providing an HPS to a user device (e.g., an HMD) or a user.

First, the networking apparatus 100 includes an application 110 storing content of HPSs. The application 110 is a user area and corresponds to a layer 7.

The networking apparatus 100 corresponds to a kernel area of a layer 6 and stores information about HPS clients in advance in a descriptor file including performance parameters corresponding to a quality-of-service (QoS) profile (120). In this case, the performance parameters may include availability, a mean time between failures (MTBF), a latency, a bandwidth, and the like. The networking apparatus 100 stores performance parameters, which are defined in units of ultra-reliable and low-latency communication (URLLC) HPSs, in a descriptor file, and designates a performance parameter for a QoS profile in a corresponding application program interface (API) to secure the quality of an HPS, in response to a request for the HPS.

In addition, the networking apparatus 100 generates a kernel in response to a request for the HPS through socket communication 130 corresponding to a layer 5. In this case, when a user requests the HPS, a flow table (e.g., SocIP, Socport, protocol, DesIP, or DesPort) is updated to provide the user with the HPS through the socket communication 130.

The networking apparatus 100 provides the HPS at a transport layer using a transmission control protocol (TCP) or a user datagram protocol (UDP) at a transport layer (140) corresponding to a layer 4. In this case, when the user requests the HPS, the HPS is transmitted to the application 110 through the TCP. Thereafter, in order to provide the HPS to the user of the application 110, a UDP header is added to an HPS packet and the HPS packet is transmitted to an IP of a layer 3 through the UDP to fix a delay and latency in the TCP.

In addition, the networking apparatus 100 adds an IP header to an Ethernet packet and transmits the Ethernet packet through the TCP when a client requests the HPS through the IP of the layer 3. In contrast, in order to provide the HPS, an IP header is added in front of a UDP header and transmitted using an optimal algorithm (e.g., a queuing discipline (Qdisc) algorithm) according to a type of a data packet of the HPS. Hereinafter, for convenience of description, the present disclosure will be described with respect to the 'Qdisc algorithm' as an example of the optimal algorithm but it will be obvious that the technical idea according to an embodiment of the present disclosure may be implemented by algorithms other than the 'Qdisc algorithm.'

In addition, the networking apparatus 100 selects an optimal sub-algorithm according to the type of the data packet when the HPS is provided to the client after applying the Qdisc algorithm (160). For example, a CBS Qdisc algorithm may be applied to video data, and a Taprio algorithm or a Taprio+ETF Qdisc algorithm may be applied to transmit in-time and on-time HPS data packet. Therefore, a function of transmitting the HPS data packet to the client by securing quality in a delay and latency is performed.

In addition, the networking apparatus 100 performs a function of receiving a request for the HPS from a client in a device area through a network interface card (NIC) and a driver or transmitting content through a port by assigning a bandwidth to transmit the HPS requested by the client.

Figure 2:
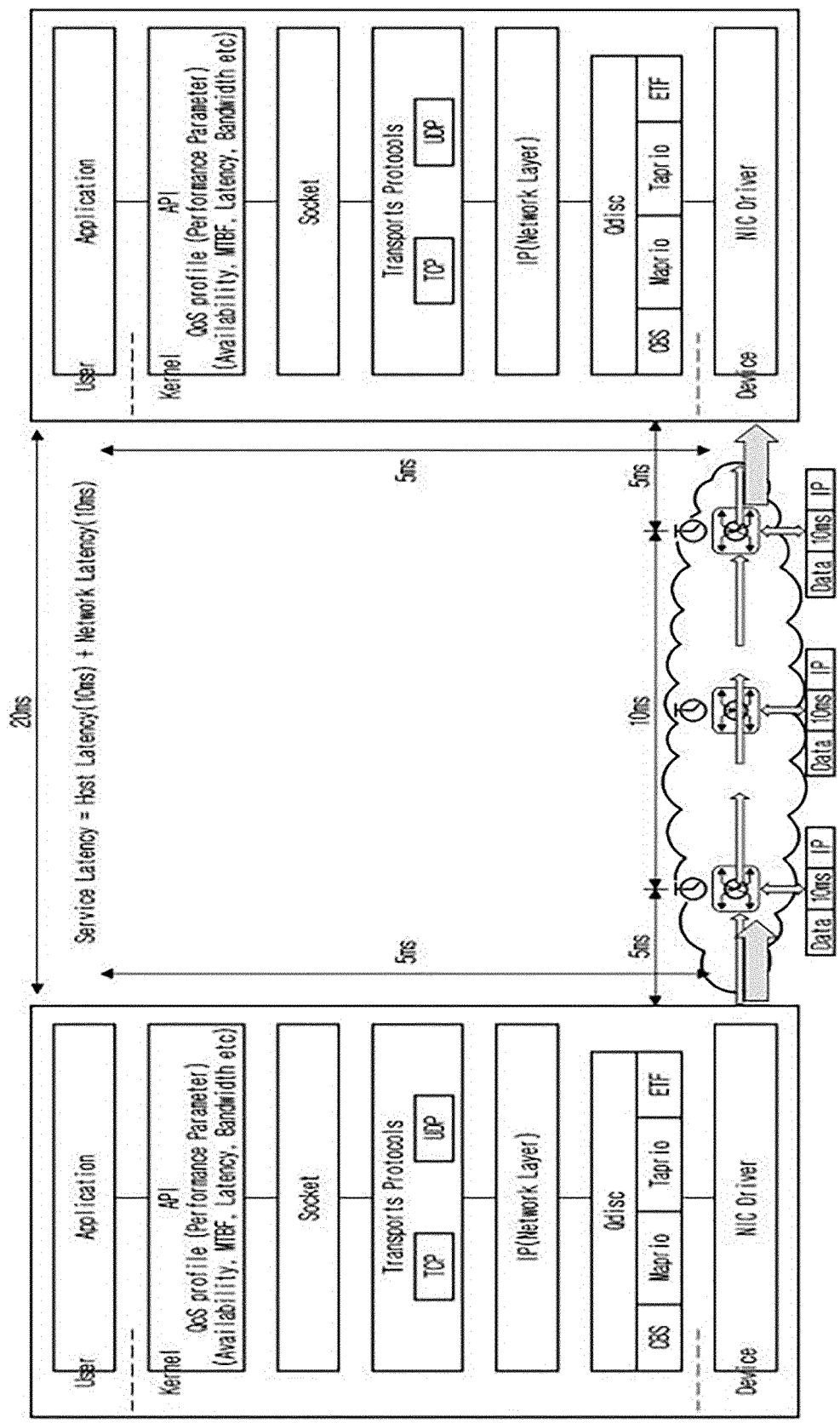
FIG. 2 is a diagram illustrating a configuration of end-to-end HPS networking transmission according to an embodiment of the present disclosure.

FIG. 2 is a diagram illustrating a configuration of the transmission of end-to-end HPS data packets for different clients according to an embodiment of the present disclosure. Referring to FIG. 2, a service latency is determined from the sum of a host latency and a network latency. Therefore, according to an embodiment of the present disclosure, the host latency is minimized to 10 ms or less to prevent a delay of a total service latency. Therefore, the network latency will not be additionally described here.

FIGS. 3A and 3B illustrate performance requirements (performance parameters or key performance indicators (KPIs)) according to the type of an HPS according to an embodiment of the present disclosure.

The KPIs may include availability, an MTBF, an end-to-end latency, an image recognition latency, an intermediate data uploading latency, a service bit rate in a user empirical bandwidth, etc.

Figure 4:
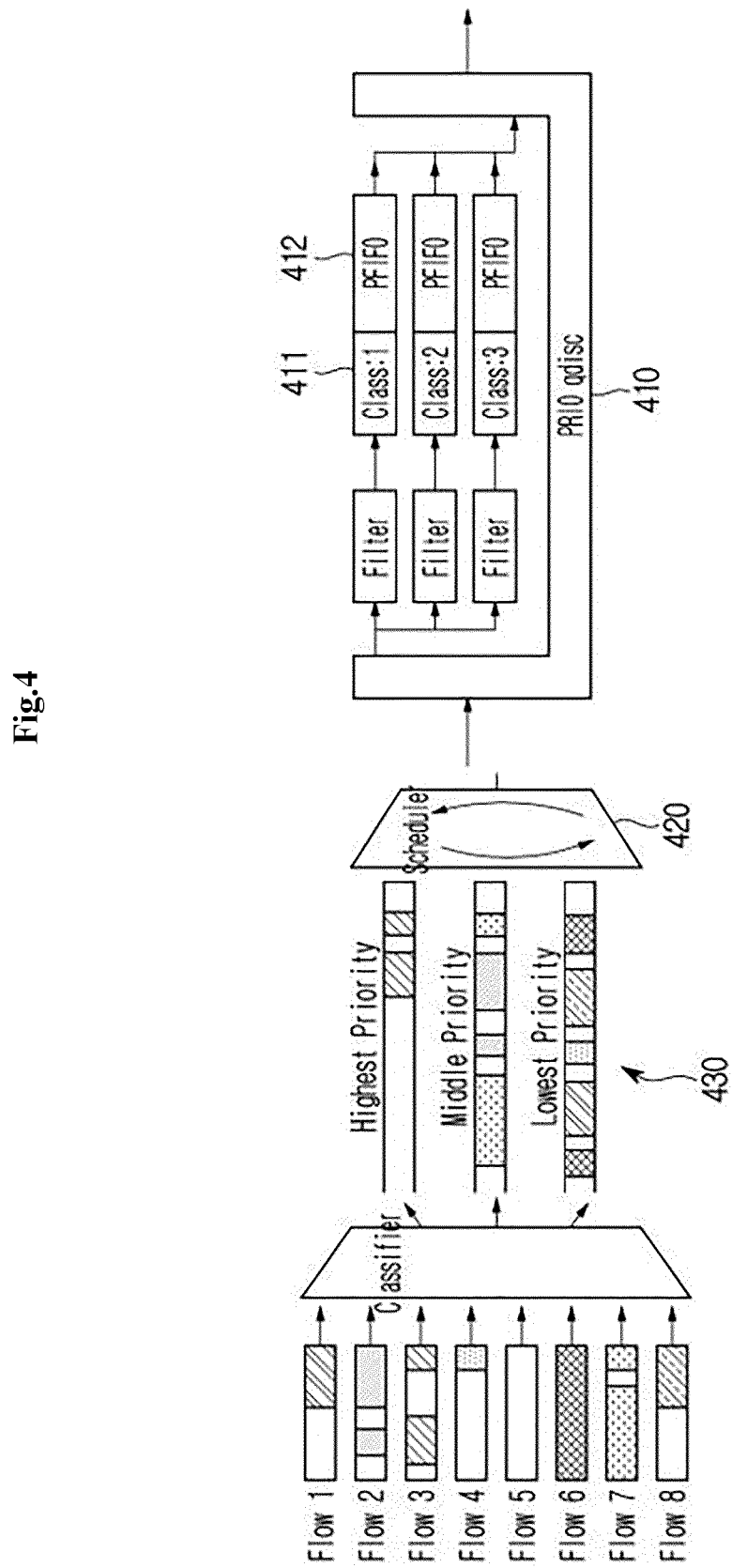
FIG. 4 is a diagram illustrating a setup of a traffic control (TC) PRIO queuing discipline (Qdisc) algorithm according to an embodiment of the present disclosure.

FIG. 4 is a diagram illustrating a setup of a Traffic Control (TC) Priority Shaper (PRIO) Qdisc algorithm according to an embodiment of the present disclosure. A PRIO Qdisc 410 may be applied to a simple class-based queue rule including an arbitrary number of classes with different priorities. Here, the classes are sorted according to the priorities in descending order (430). In this regard, PRIO is a scheduler 420 that is Qdisc conserving a task without causing a delay in packets but Qdiscs included in the classes may not be such Qdiscs. In addition, the PRIO Qdisc 410 is a Qdisc algorithm that is very useful in reducing a latency when a traffic speed need not be reduced.

Therefore, when a new PRIO queue is generated according to a given command, three classes 411 named:1/:2/:3 are automatically generated and a PFIFO (412) Qdisc is automatically applied. Thereafter, class 1 packet transmission, class 2 packet transmission, and class 3 packet transmission are sequentially performed.

Figure 5A:
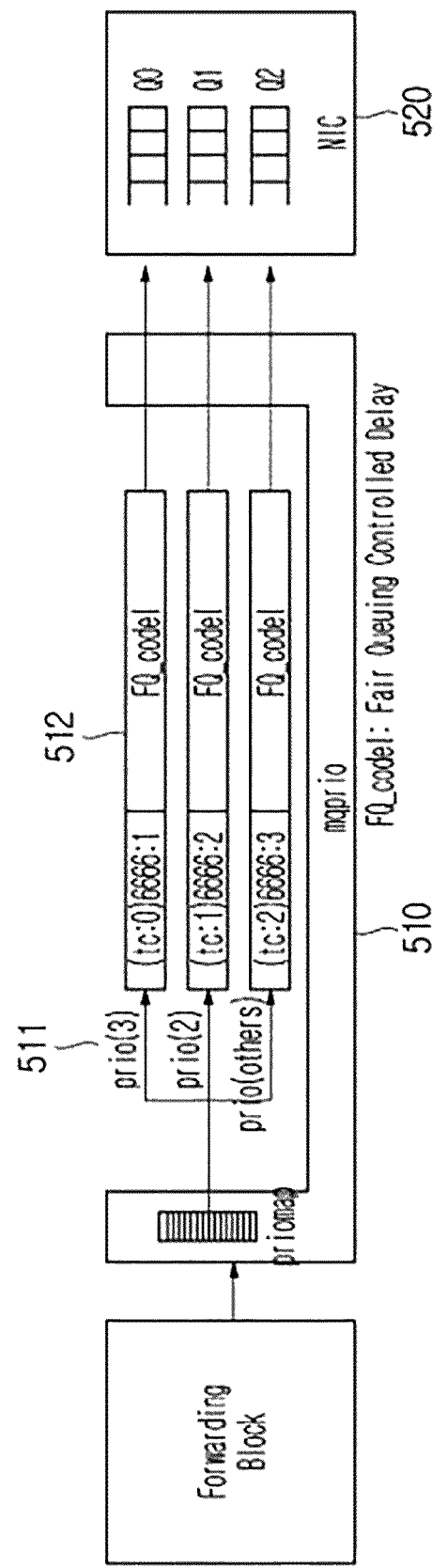
FIG. 5A is a diagram illustrating a setup of a TC MQPRiO Qdisc algorithm according to an embodiment of the present disclosure.
Figure 5B:
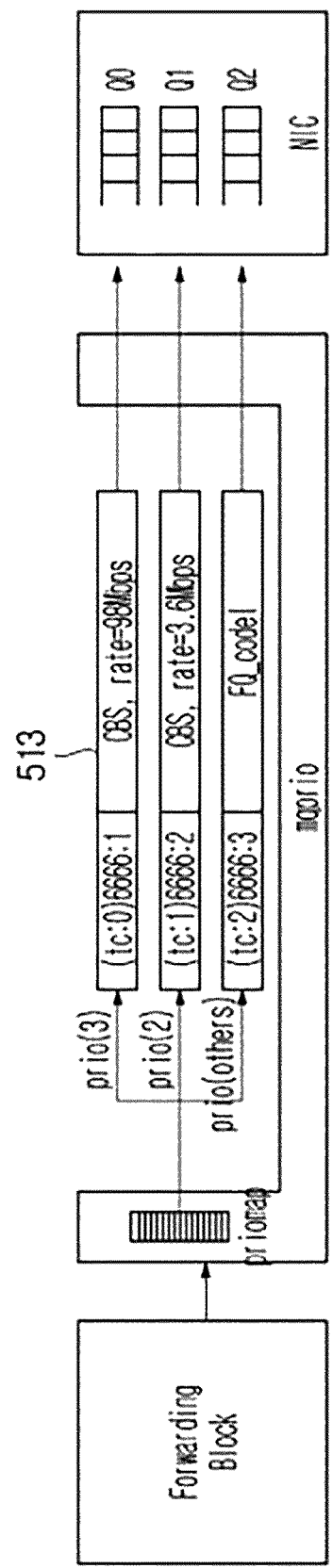
FIG. 5B is a diagram illustrating a setup of a TC CBS Qdisc algorithm according to an embodiment of the present disclosure.

FIGS. 5A and 5B are diagrams illustrating a setup of a TC Credit-Based Shaper (CBS) Qdisc algorithm according to an embodiment of the present disclosure.

First, FIG. 5A illustrates step 1 for configuring CBS Qdisc. The CBS Qdisc includes an MQPRIO Qdisc 510. First, in step 1, the MQPRIO Qdisc 510 maps a traffic flow to a hardware queue range using priority to apply configurable priority for mapping of traffic classes. Thereafter, the MQPRIO Qdisc 510 provides and executes hardware-based transmission queues TxQ and RxQ, and defines and provides a method of mapping traffic classes to hardware queues by mapping network priorities to the traffic classes. For example, as shown in FIG. 5A, priority is classified into three priorities 511, and the three priorities 511 are transmitted to Fair Queuing Controlled Delay (FQ_codel) 512 and finally to an NIC 520.

Next, FIG. 5B illustrates a second step for configuring the CBS Qdisc. For example, in step 1 above, the MQPRIO Qdisc 510 is applied by installing Qdisc in the FQ_codel 512 and replacing FQ_codel Qdiscs Q0 and Q1 with CBS (513).

Figure 6:
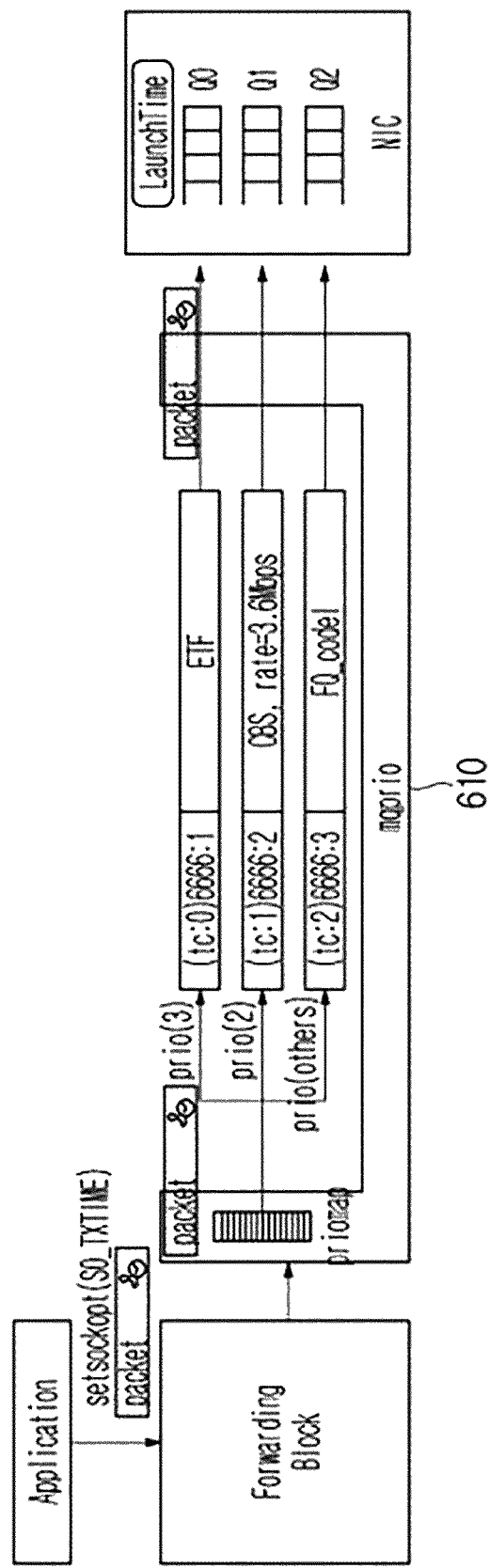
FIG. 6 is a diagram illustrating a setup of a TC ETF Qdisc algorithm according to an embodiment of the present disclosure.

Here, parameters of the CBS Qdisc are defined as follows.
  idleSlope: a credit rate accumulated when queues are not transmitted
  sendSlope: a credit rate consumed when queues are transmitted
  hiCredit: a maximum amount of credits that a queue may have
  loCredit: a minimum amount of credits that a queue may have For example, instructions to set a stream A to Q0 and a stream B to Q1 are as follows.
  stream A: SR class A, AVTP Compressed Video Format, H.264 profile High, 1920×1080, 30 fps
  stream B: SR class B, AVTP Audio Format, PCM 16-bit sample, 48 kHz, stereo, 12 frames per AVTPDU FIG. 6 is a diagram illustrating a setup of a TC Earliest Txtime First (ETF) Qdisc according to an embodiment of the present disclosure. A TC ETF Qdisc 610 provides a LaunchTime function of allowing an Ethernet controller and other NICs to transmit frames at a specific time. For example, in Linux, the hardware function is enabled by SO_TXTIME stockopt and ETF Qdisc. When the SO_TXTIME sockopt is used, an application may configure a transmission time for each frame, and the ETF Qdiscs allow frames received from multiple sockets to be transmitted to hardware aligned according to a transmission time.

Similar to CBS Qdisc, ETF Qdiscs operate in units of queues and require an MQPRIO configuration described in a CBS Qdisc configuration. Parameters of the ETF Qdisc are defined as follows.
  clockid: specifies a clock to be used by an internal timer of the Qdisc to measure a time and schedule an event. The Qdisc uses the same clock ID as the reference to transmission timestamps txtime of packets passing through the clock. Packets coming from a socket that does not comply with the above rule are dropped. To use the ETF Qdisc, a system clock should be synchronized with a PTP hardware clock.
  delta: After enqueueing or dequeueing a packet, the Qdisc will schedule a next wake-up time for a next txtime minus a delta value. This means that delta can be used as a fudge factor for a latency in a scheduler latency of the system. The delta value should be specified in nanoseconds. The default value is 0 nanoseconds.
  deadline_mode: When deadline_mode is set, the Qdisc handles txtime with a different semantic, changed from 'strict' transmission time to a deadline. In practice, this means that during a dequeue flow, etf(8) will set the txtime of a packet to be dequeued to 'now.' The default is for this option to be disabled.
  offroad: when offload is set, etf(8) will try to configure a network interface so that time-based transmission arbitration is enabled by a controller. This function is commonly referred to as "start time" or "time-based scheduling" in the Network Interface Controller documentation. The default is not to use this option.
  skip_sock_check: etf(8) drops a packet that is not currently associated with a socket or for which the SO_TXTIME socket option is not set for the socket. However, skip_sock_check will not work when a launch time is set by another entity inside a kernel (e.g., another Qdisc). When skip_sock_check is set, the inspection of a socket associated with a packet is skipped.

FIG. 6 illustrates an example of configuring ETF Qdisc in Q0 according to a command and performing offloading.

Figure 7:
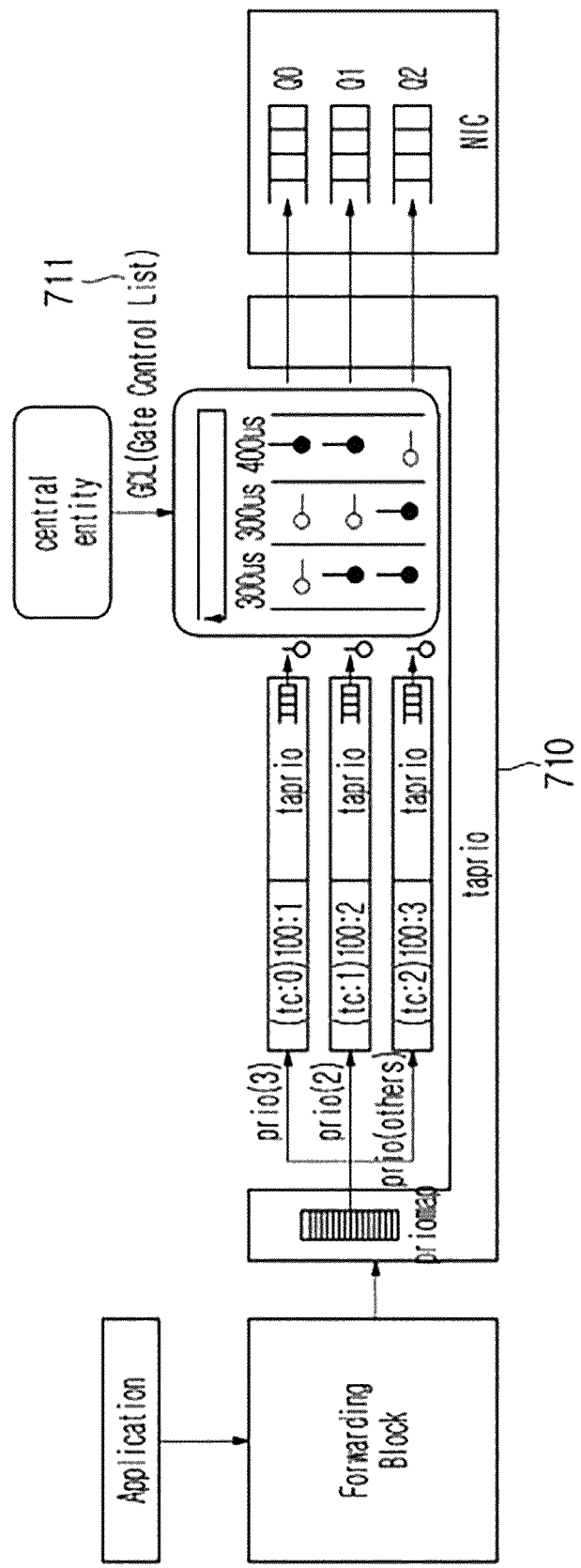
FIG. 7 is a diagram illustrating a setup of a TC TAPRIO Qdisc algorithm according to an embodiment of the present disclosure.

FIG. 7 is a diagram illustrating a setup of a TC Time Aware Priority shaper (TAPRIO) Qdisc according to an embodiment of the present disclosure. A TAPRIO Qdisc 710 is configured by employing an Enhancements-for-Scheduled-Traffic (EST) feature according to the IEEE 802.1Q-2018, allowing transmission to be scheduled in each queue according to a set time scale. Here, a transmission gate is connected to each queue, and whether to select the transmission gate for the transmission of frames in each queue is determined according to a state (e.g., "open" or "closed") of the transmission gate. Each port is connected to a gate control list (GCL) 711 including an ordered list of gate operations. For more details about how this feature works, see Section 8.6.8.4 of IEEE 802.1Q-2018. Linus supports the EST feature through the TAPRIO Qdisc. Similar to MQPRIO, the TAPRIO Qdisc 710 defines, for example, a method of mapping Linux networking stack priorities to traffic classes and a method of mapping the traffic classes to hardware queues. FIG. 7 illustrates the following case in which it is assumed that traffic is to be reserved for three traffic classes according to an embodiment.
  A first transmission window time is 300 μs and 0 is transmitted as a traffic class tc.
  A second transmission window time is 300 μs and both 0 and 1 are transmitted as a traffic class tc.
  A third transmission window time is 400 μs and only 2 is transmitted as a traffic class tc.
  A next schedule starts with absolute time '1,000,000,000.'

Figure 8:
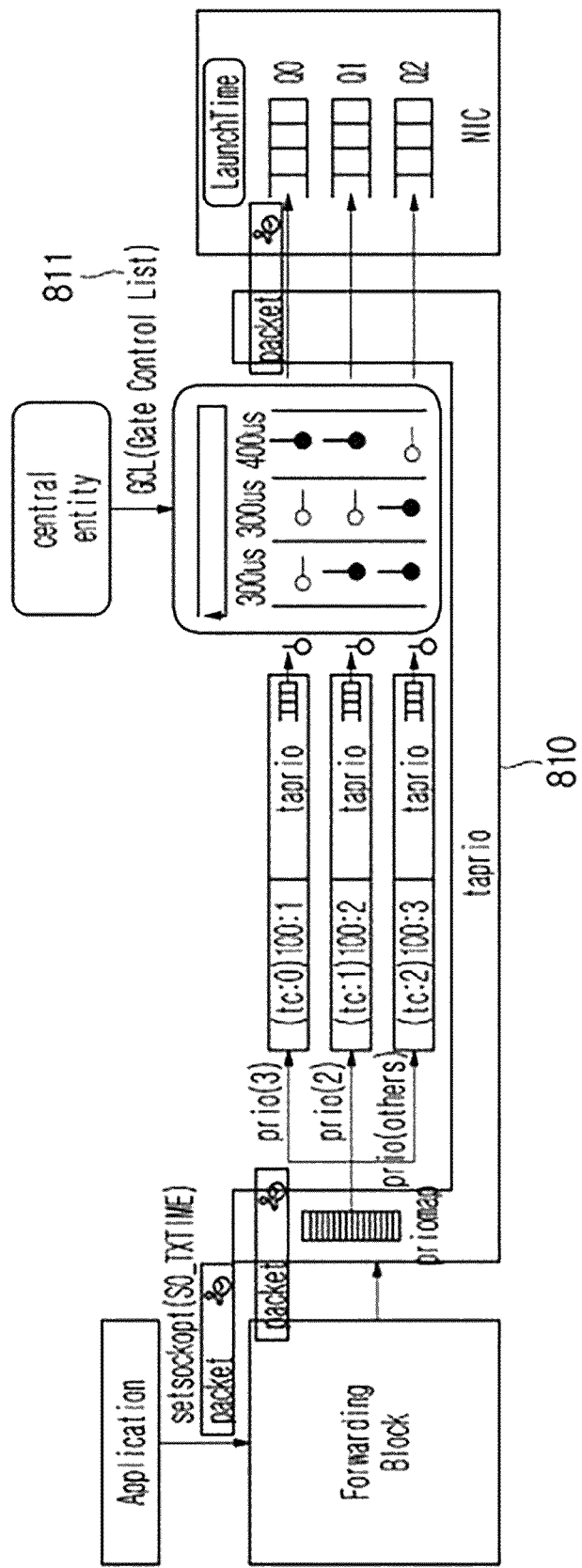
FIG. 8 is a diagram illustrating a setup of a TC TAPRIO+ETF Qdisc algorithm according to an embodiment of the present disclosure.

FIG. 8 is a diagram illustrating a setup of a TC Time Aware Priority shaper (TAPRIO)+ETF Qdisc algorithm. A TAPRIO+ETF Qdisc 810 configures a set of gate states in which when a TxTime transmission support mode is enabled, an ETF Qdisc is installed in a hardware queue applied by TAPRIO to enable LaunchTime in an NIC and packets are permitted according to a transmission time before the packets are delivered to a controller. The ETF Qdisc is installed as shown in the embodiment of FIG. 8. When both the TAPRIO and ETF Qdiscs are set up correctly, traffic generated by all applications running on an eth0 interface is applied to a configured set of Gate Control Lists (GCLs) 811 and transmitted to the NIC.

In this regard, the TAPRIO Qdisc and the TAPRIO+ETF Qdisc may employ the EST feature (also known as 'Qbv') in IEEE 802.1Q-2018 to schedule transmission in each queue according to a fixed time scale (in-time and on-time). Here, whether to select a transmission gate for the transmission of frames in each queue is determined according to a state (e.g., "open" or "closed" state) of the transmission gate. When EST is used, a system can be configured similar to that defined in IEEE 802.1Qcc-2018 and applied to complex networks. In addition, the TAPRIO and TAPRIO+ETF Qdisc algorithms allow HPSs to be provided while satisfying in-time/on-time latency requirements in the case of HPSs such as in industrial telemedicine, remote robotic surgery, manufacture automation, and smart grids.

Figure 9:
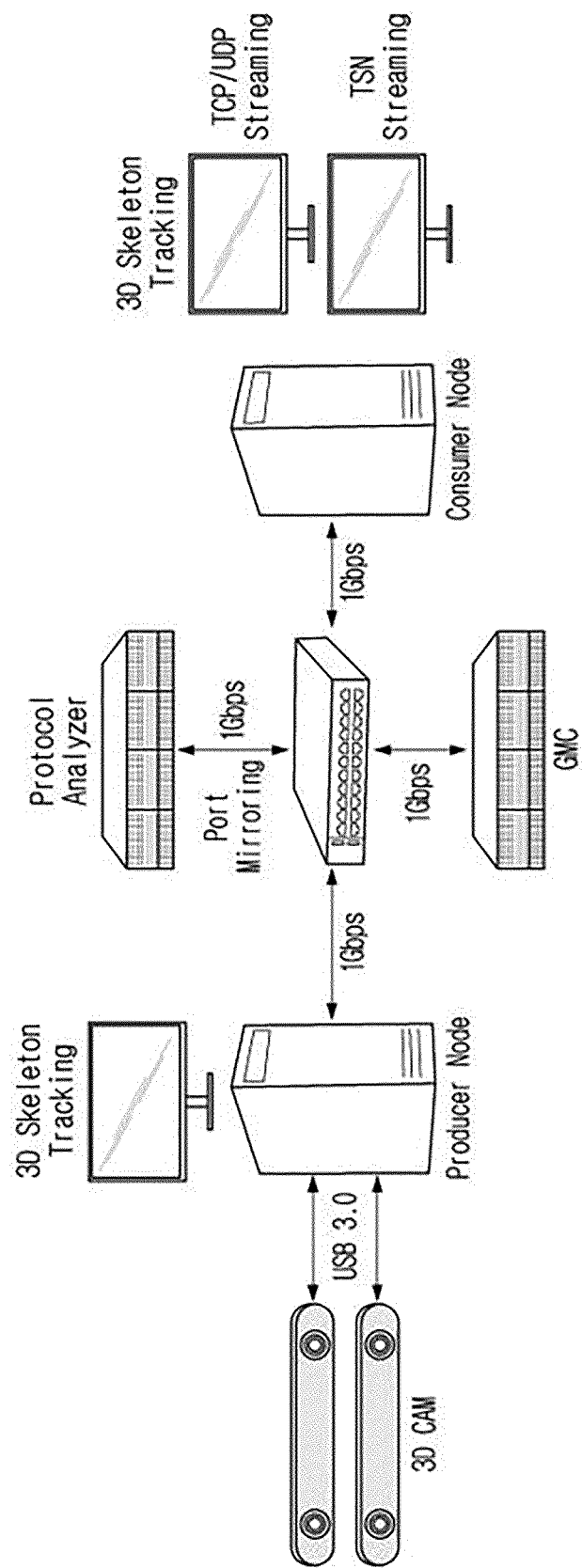

FIGS. 9 and 10 are diagrams illustrating a test environment configuration of an inter-algorithm performance analysis according to an embodiment of the present disclosure, and result data of performance test.

First, FIG. 9 is a diagram illustrating a test environment configuration of the inter-algorithm performance test according to an embodiment of the present disclosure. For example, algorithms (e.g., Qdiscs CBS, Mqprio, and Taprio) applied to an embodiment of the present disclosure are compared with conventional best-effort algorithms.

Specifically, a scenario of a performance test conducted on a performance test environment for a Time-Sensitive Networking (TSN) Traffic Control (TC) Qdisc algorithm of FIG. 9 will be described below.

[Performance Test Scenario]
A test is conducted by generating best-effort traffic (60%, 80%, and 100%) (for example, by applying best-effort traffic 700 MB, 800 MB, and 900 MB) using traffic generation equipment.
Three-dimensional (3D) content data is transmitted together with the best-effort traffic.
Jitter, a latency, packet loss, and a bandwidth that are key performance indexes (KPIs) of an inter-algorithm performance test are measured.

[Performance Test Method]
Jitter, a latency, packet loss, a bandwidth, etc., which are KPIs, of each of Qdisc algorithms (CBS, Mqprio, and Taprio) are measured by transmitting 3D content data through the UDP while generating best-effort traffic (60%, 80%, and 100%).

FIG. 10 shows result data of an inter-algorithm performance test according to the present disclosure. The result data of the performance test of FIG. 10 was obtained by conducting the performance test on Qdisc algorithms by measuring jitter, a latency, packet loss, and a bandwidth, which are KPIs, ten times at a time under the same conditions. The result data of the performance test of FIG. 10 shows that Qdisc algorithms (CBS, Mqprio, and Taprio) according to an embodiment of the present disclosure exhibit excellent performance compared to a conventional best-effort algorithm.

FIGS. 11A-11B, 12A-12B, 13A-13B, 14A-14B, 15A-15B, and 16A-16B are diagrams illustrating a one-way ANOVA method in a design of experiments (DoE) using data of a performance test conducted on Qdisc algorithms according to an embodiment of the present disclosure.

First, FIGS. 11A and 11B are distribution analysis tables to which a one way ANOVA model is applied in the DoE applied to perform a performance analysis on KPIs of each of Qdisc algorithms when an HPS according to an embodiment of the present disclosure is provided.

FIG. 12A is data of descriptive statistics of result data of a performance test obtained by measuring jitter, a latency, packet loss, and a bandwidth, which are KPIs, of each of Qdisc algorithms (Qdisc CBS, Mqprio, and Taprio) ten times at a time under the same condition when an HSP according to an embodiment of the present disclosure is provided. Here, the descriptive statistics may be represented according to a range, a minimum, a maximum, a mean, a standard variation, skewness, and kurtosis. FIG. 12B shows a result of performing the performance test on each of four algorithms (e.g., best effort, CBS, MQPRIO, and TAPRIO) ten times.

FIGS. 13A and 13B are diagrams illustrating a result of a performance analysis for an F-test, which is an ANOVA distribution analysis, conducted by applying the one way ANOVA model of the DoE using the result data of the performance test of FIG. 10 conducted on algorithms (e.g., best effort, Qdisc CBS, Mqprio, and Taprio) according to an embodiment of the present disclosure. Here, result data of the performance test obtained by measuring jitter, a latency, packet loss, and a bandwidth, which are KPIs, 10 times at a time under the same conditions were used.

[One-Way ANOVA F—Test]
(1) Hypothesis
null hypothesis ($H_0$): Best effort($\mu_1$)=MQPRIO($\mu_2$)=CBS ($\mu_3$)=TAPRIO($\mu_4$)
$\mu_1=\mu_2=\mu_3=\mu_4 \rightarrow$ there is no difference in means among BE, MQPRIO, CBS, and TAPRIO.
alternative hypothesis ($H_1$): Best effort($\mu_1$)≠MQPRIO($\mu_2$)≠CBS($\mu_3$)≠TAPRIO($\mu_4$)
$\mu_1 \neq \mu_2 \neq \mu_3 \neq \mu_4 \rightarrow$ there is a difference in means among BE, MQPRIO, CBS, and TAPRIO.
(2) Test: Compare whether a significance level $\alpha=0.05$ and determine that there is a significant difference when $\alpha$ is less than 0.05.
(3) Test result: there was a significant difference among best effort, MQPRIO, CBS, and TAPRIO in terms of in latency, jitter, and packet loss.
(4) That is, there was a significant difference between best effort and MQPRIO, CBS, and TAPRIO, which are Qdisc algorithms, and thus a multiple comparison analysis is needed.

Figures 14A, 14B:
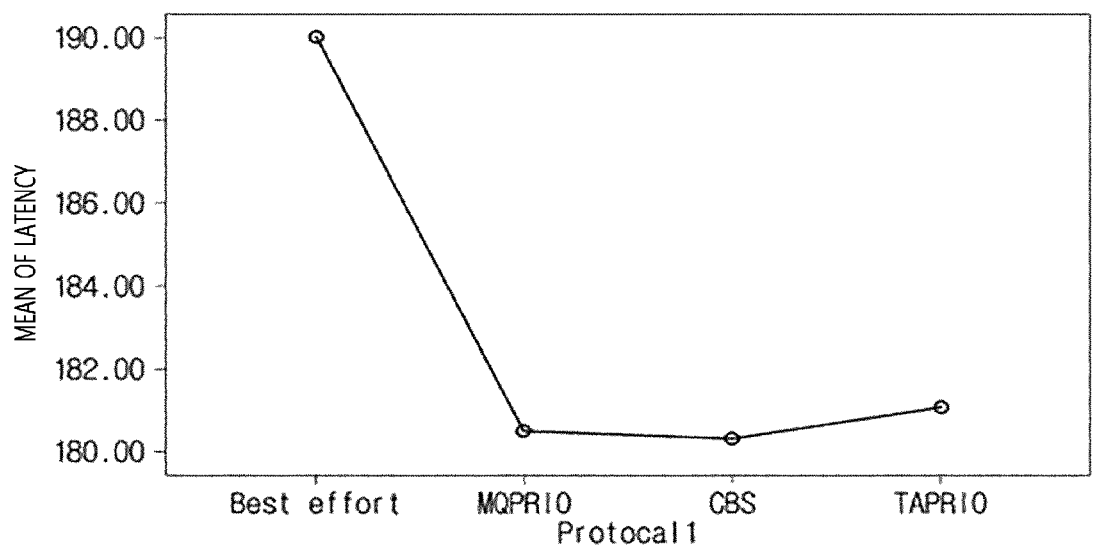

FIGS. 14A and 14B are diagrams illustrating result data of a performance test obtained by measuring a latency, which is a KPI, ten times at a time under the same condition using the result data of the performance test of FIG. 10 conducted on algorithms (e.g., best effort, Qdisc CBS, Mqprio, and Taprio) according to an embodiment of the present disclosure. In particular, FIG. 14A illustrates a result of a performance analysis conducted on latency data, which is a performance item, using a least significant difference (LSD) model as a multiple comparison analysis model on the basis of the results of the performance analysis of FIGS. 13A and 13B for an F-test, which is an ANOVA distribution analysis, by applying the one way ANOVA model in the DoE. Referring to FIG. 14B, there is a significant difference among best effort and MQPRIO, CBS, and TAPRIO, which are Qdisc algorithms.

[Test of Latency, which is Performance Item, of Each Algorithm Using LSD Model as Multiple Comparison Analysis Model]
(1) Hypothesis
null hypothesis ($H_0$): best effort($\mu_1$)=MQPRIO($\mu_2$)=CBS($\mu_3$)=TAPRIO($\mu_4$)
$\mu_1=\mu_2=\mu_3=\mu_4 \rightarrow$ there is no difference in latency among BE, MQPRIO, CBS, and TAPRIO.
alternative hypothesis ($H_1$): best effort($\mu_1$)≠MQPRIO($\mu_2$)≠CBS($\mu_3$)≠TAPRIO($\mu_4$)
$\mu_1 \neq \mu_2 \neq \mu_3 \neq \mu_4 \rightarrow$ there is a difference in latency among BE, MQPRIO, CBS, and TAPRIO.
(2) Test: Compare whether a significance level $\alpha=0.05$ and determine that there is a significant difference when $\alpha$ is less than 0.05.
(3) Test result:
There was a significant difference in latency between best effort and TAPRIO and between MQPRIO and CBS.
There was a significant difference in latency between MQPRIO and best effort, but there was no significant difference with CBS and there is a significant difference with TAPRIO.
There was a significant difference between CBS and best effort, but there was no significant difference with MQPRIO and there was a significant difference with TAPRIO.
There was a significant difference in latency among TAPRIO, best effort, MQPRIO, and CBS.

(4) That is, a result of a multiple comparison performance analysis on the basis of an LSD between Qdisc algorithms showed that a latency was high in the order of MQPRIO=CBS<TAPRIO<Best effort. Therefore, it can be seen that the MQPRIO and CBS algorithms are algorithms with low latency.

Figures 15A, 15B:
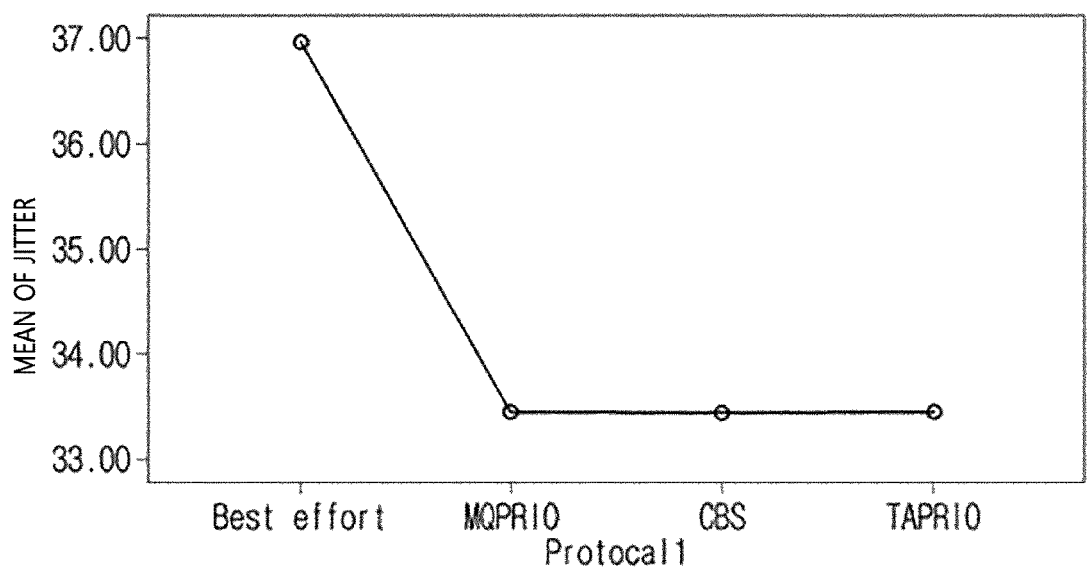

FIGS. 15A and 15B are diagrams illustrating result data of a performance test obtained by measuring jitter, which is a KPI, ten times at a time under the same condition using the result data of the performance test of FIG. 10 conducted on algorithms (e.g., best effort, Qdisc CBS, Mqprio, and Taprio) according to an embodiment of the present disclosure. In particular, FIG. 15A illustrates a result of a performance analysis conducted on jitter data, which is a performance item, using an LSD model as a multiple comparison analysis model on the basis of the results of the performance analysis of FIGS. 13A and 13B for an F-test, which is an ANOVA distribution analysis, by applying the one way ANOVA model in the DoE. Referring to FIG. 15B, there is a significant difference between Best Effort and MQPRIO, CBS, and TAPRIO, which are Qdisc algorithms.

[Test of Jitter, which is Performance Item, of Each Algorithm Using LSD Model as Multiple Comparison Analysis Model]

(1) Hypothesis null hypothesis ($H_0$): best effort($\mu_1$)=MQPRIO($\mu_2$)=CBS ($\mu_3$)=TAPRIO($\mu_4$)

$\mu_1=\mu_2=\mu_3=\mu_4$→there is no difference in jitter among BE, MQPRIO, CBS, and TAPRIO.

alternative hypothesis ($H_1$): best effort($\mu_1$)≠ MQPRIO($\mu_2$)≠CBS ($\mu_3$)≠TAPRIO($\mu_4$)

$\mu_1 \neq \mu_2 \neq \mu_3 \neq \mu_4$→there is a difference in jitter among BE, MQPRIO, CBS, and TAPRIO.

(2) Test: Compare whether a significance level $\alpha=0.05$ and determine that there is a significant difference when $\alpha$ is less than 0.05.

(3) Test result:

There was a significant difference in jitter between best effort and MQPRIO, CBS, and TAPRIO.

There was a significant difference in jitter between MQPRIO and best effort, but there was no significant difference between CBS and TAPRIO.

There was a significant difference in jitter between CBS and best effort but there was no significant difference in jitter between MQPRIO and TAPRIO.

There was a significant difference in jitter between TAPRIO and best effort but there was no significant difference in jitter between MQPRIO and CBS.

(4) That is, there was a significant difference in jitter, which is a performance item, between best effort and the other three algorithms, i.e., MQPRIO, CBS, and TAPRIO, and the three algorithms exhibited the same performance in terms of jitter. Accordingly, it can be seen from the result of the performance in jitter, i.e., MQPRIO=CBS=TAPRIO<Best effort, that the MQPRIO, CBS, and TAPRIO algorithms exhibited the same performance in jitter and best effort showed high jitter.

Figures 16A, 16B:
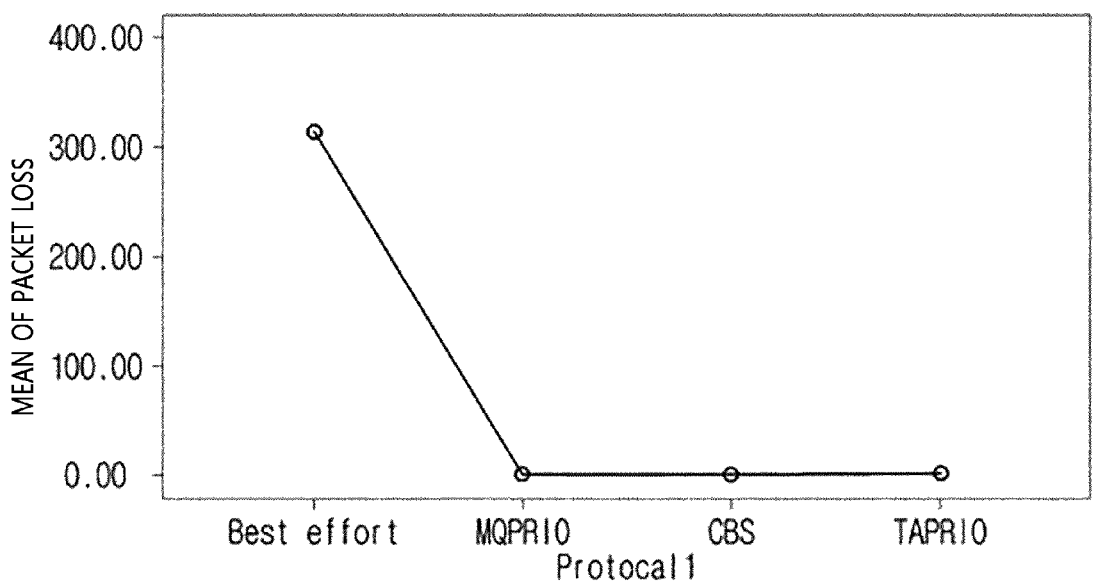

FIGS. 16A and 16B are diagrams illustrating result data of a performance test obtained by measuring packet loss, which is a KPI, ten times at a time under the same condition using the result data of the performance test of FIG. 10 conducted on algorithms (e.g., best effort, Qdisc CBS, Mqprio, and Taprio) according to an embodiment of the present disclosure. In particular, FIG. 16A illustrates a result of a performance analysis conducted on packet loss data, which is a performance item, using an LSD model as a multiple comparison analysis model on the basis of the result of the performance analysis of FIG. 13A/13B for an F-test, which is an ANOVA distribution analysis, by applying the one way ANOVA model in the DoE. Referring to FIG. 16B, there is a significant difference between best effort and MQPRIO, CBS, and TAPRIO, which are Qdisc algorithms.

[Performance Item Test Packet Loss Between Algorithms Using LSD Model as Multiple Comparison Analysis]

(1) Hypothesis null hypothesis ($H_0$): best effort($\mu_1$)=MQPRIO($\mu_2$)=CBS ($\mu_3$) TAPRIO($\mu_4$)

$\mu_1=\mu_2=\mu_3=\mu_4$→there is no difference in packet loss among BE, MQPRIO, CBS, and TAPRIO alternative hypothesis ($H_1$): best effort($\mu_1$)≠ MQPRIO($\mu_2$)≠CBS($\mu_3$)≠TAPRIO($\mu_4$)

$\mu_1 \neq \mu_2 \neq \mu_3 \neq \mu_4$→there is a difference in packet loss among BE, MQPRIO, CBS, and TAPRIO.

(2) Test: Compare whether a significance level $\alpha=0.05$ and determine that there is a significant difference when $\alpha$ is less than 0.05.

(3) Test result:

There was a significant difference in packet loss between best effort and the three algorithms, i.e., MQPRIO, CBS, and TAPRIO.

There was a significant difference in packet loss between MQPRIO and best effort, but there was no significant difference in packet loss between CBS and TAPRIO.

There was a significant difference in packet loss between CBS and best effort but there was no significant difference in packet loss between MQPRIO and TAPRIO.

There was a significant difference in packet loss between TAPRIO and best effort but there was no significant difference in packet loss between MQPRIO and CBS.

(4) That is, there was a significant difference in packet loss, which is a performance item, between best effort and the other three algorithms, i.e., MQPRIO, CBS, and TAPRIO, and the three algorithms exhibited the same performance in packet loss. Accordingly, it can be seen from the result of the performance in packet loss, i.e., MQPRIO=CBS=TAPRIO<best effort, that the MQPRIO, CBS, and TAPRIO algorithms exhibited the same performance in packet loss and best effort showed high packet loss.

Figure 17A:
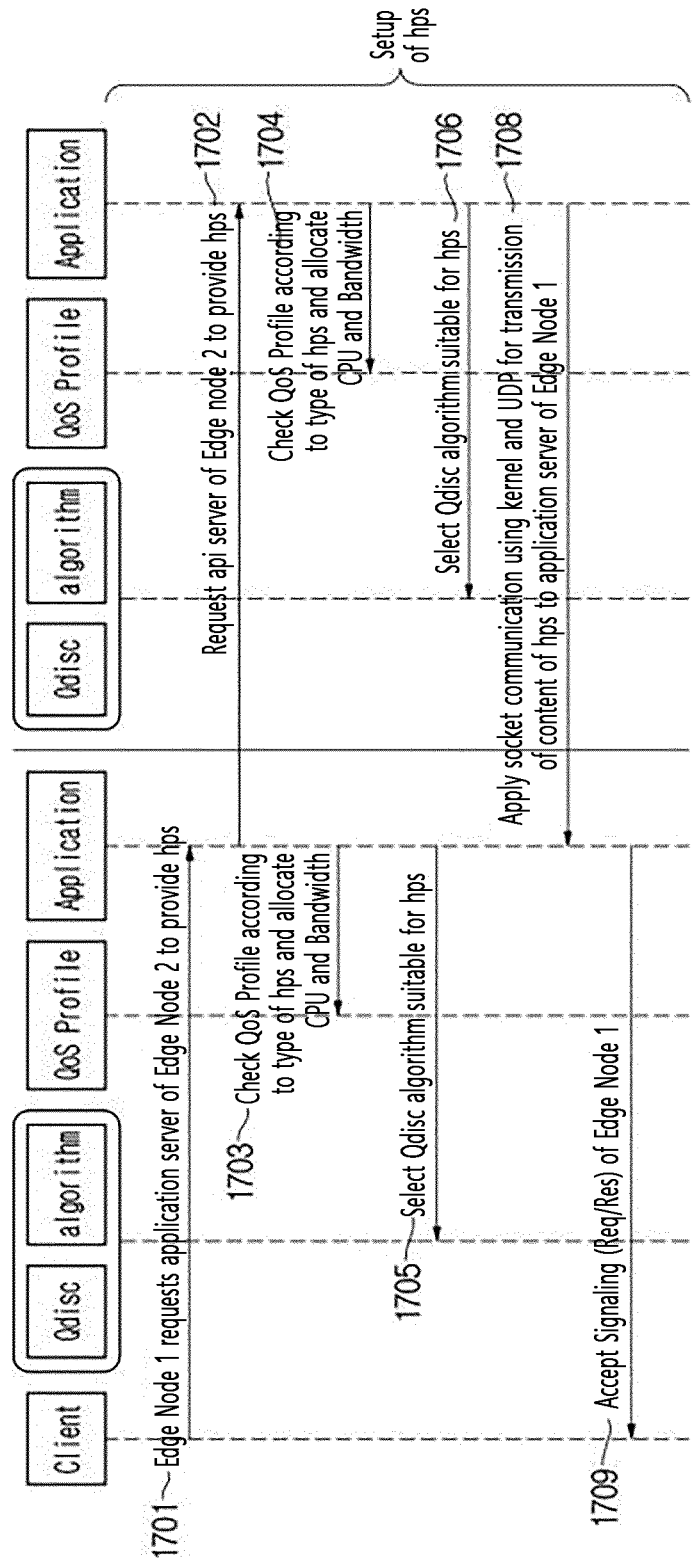
FIGS. 17A and 17B are diagrams illustrating a setup of a communication service for a request for an HPS and a content transmission procedure according to an embodiment of the present disclosure.
Figure 17B:
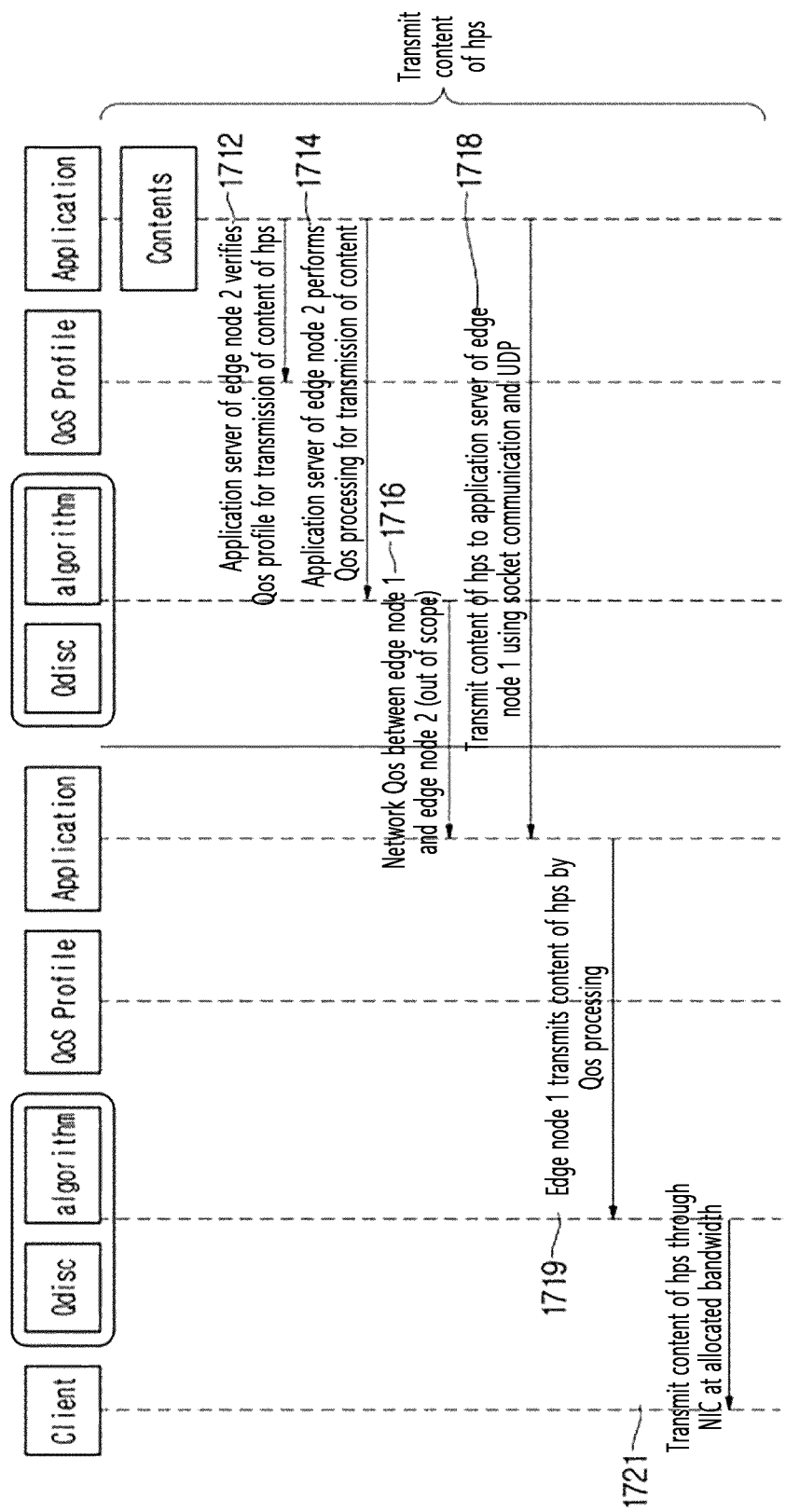

FIGS. 17A and 17B are diagrams illustrating a setup of a communication service for a request for an HPS (see FIG. 17A) and a content transmission procedure (see FIG. 17B) according to an embodiment of the present disclosure.

For example, referring to FIG. 17A, a client device and an HPS server device according to an embodiment of the present disclosure perform a setup process to provide an HPS when a client requests the HPS (e.g., URLLC) through an edge node 1.

Specifically, for example, when the client of the edge node 1 requests an application server of an edge node 2 to provide an HPS (1701), an API of the application server of the edge node 2 checks a QoS profile (shown, for example, in FIG. 3) defined in advance according to a type of the client requesting the HPS through the edge node 1 and allocates a central processing unit (CPU) and a bandwidth (1703). Thereafter, when a Qdisc is requested to perform setup via a kernel through socket communication, the Qdisc selects a Qdisc algorithm suitable for the HPS to be provided (1705). Thereafter, a setup procedure to prepare for the transmission of the HPS requested by the client to a port of an NIC is completed by allocating a bandwidth through the NIC. When the setup procedure is completed, the client is notified of the acceptance of signaling Req/Res (1709).

At this time, according to a transmission network QoS setting between the nodes, the edge node 2 is connected to and the application server of the edge node 2 performs QoS setup corresponding to the HPS. That is, the edge node 2 performs and applies a setup procedure in the same manner as the setup procedure performed by the edge node 1 (1702, 1704, 1706, and 1708).

FIG. 17B illustrates the content transmission procedure performed through an HPS after the completion of an HPS setup procedure according to FIG. 17A, according to an embodiment of the present disclosure.

After the edge node 2 completes the QoS setup procedure, the API of the edge node 2 verifies a QoS profile defined in advance with respect to QoS parameters for the transmission of content of the HPS requested by the client of the edge node 1 (1712). Thereafter, the API of the edge node 2 allocates a CPU and a bandwidth and transmits the content to the Qdisc through socket communication using a kernel and the UDP (1714). Next, a transport network QoS is set up between the edge node 1 and the edge node 2 (1716). Thereafter, the edge node 2 transmits the content of the UPS to the application server of the edge node 1 through socket communication using the kernel and the UDP (1718). Thereafter, when the content is transmitted to the Qdisc by QoS processing according to the set up procedure (1719), the server of the edge node 1 selects a Qdisc algorithm suitable for the HPS and provides the client with the content of the HPS through the port at the bandwidth allocated through the NIC (1721). In this case, for example, it is possible to transmit the content to the client through WiFi or an access point (AP). Accordingly, the content of the HPS is transmitted to the client while securing QoS such as a latency, a delay, a bandwidth, and a response time of the QoS KPI.

Examples of main operations performed by a computing method and apparatus for providing an HPS according to an embodiment of the present disclosure will be described in more detail below.

In order to transmit HPS packets to a client, a networking apparatus of a communication system server of information and communications technologies (ICT), including physical resources and virtual resources, includes a processor and a memory that stores at least one instruction to be executed by the processor.

Here, the at least one instruction may include an instruction to transmit data packets of the HPS, which are included in the physical resources, a network, and the virtual resources, to a client; an instruction to generate a flow table in advance in a socket file descriptor in an API QoS file according to a type of the client and apply the flow table to an application to transmit the HPS packets to the client; an instruction to cause the API to update the flow table in response to a request from the client; an instruction to form a new session with a new socket; an instruction to call a recording system to copy data to a send kernel memory to transmit the data to a send socket buffer in a transmission queue Txq; an instruction to allow the socket to transmit the packets to the send socket buffer as a datagram socket in the transmission queue Txq; an instruction to allow a transport layer to transmit the received packets through socket communication and the UDP; an instruction to allow the Qdisc to select a Qdisc algorithm according to the type of the HPS for the received packets and transmit the HPS and in-time/on time communication service packets to an NIC driver; and an instruction to transmit the packets to the client according to the type of the HPS through a set bandwidth of an NIC Ethernet port after applying a bandwidth agreed upon in advance with the client to secure the quality of the HPS.

In the communication system, an MTBF, an end-to-end latency, a service availability, a transmission bandwidth (bit rate), and a message size (byte) are applied as quality performance parameters required for the HPS to secure the quality of the HPS in the API QoS profile. The at least one instruction may further include an instruction to secure the QoS of the HPS by applying a CPU, a memory, and a bandwidth in advance to a flow table in a socket file descriptor of the descriptor file.

The instruction to allow the transport layer to transmit the data packets of the HPS may include an instruction to transmit the data packets by adding a UDP header by the socket using the send socket buffer as a datagram socket in the transmission queue Txq through the socket communication using a kernel and the UDP during the transmission of the data packets.

An instruction to select the TAPRIO or TAPRIO+ETF algorithm for the received packets from among Qdisc algorithms matching various types of the HPS and transmit the HPS and in-time/on-time communication service packets to the NIC driver may include selecting a Qdisc algorithm suitable for the HPS to be transmitted from among TC Qdisc algorithms, such as PRIO, CBS, MQPRIO, TAPRIO, and TAPRIO+ETF, and transmit the data packets to the NIC driver.

An instruction to select a Qdisc algorithm on the basis of a communication service according to the type of the HPS (telemedicine, remote robotic surgery, a connected car, manufacture automation, a smart grid, virtual reality (VR), augmented reality (AR), or mixed reality (MR)) may include an instruction to select and apply the Qdisc CBS algorithm in the case of video streaming, and select the TAPRIO and TAPRIO+ETF algorithms for in-time/on-time transmission of data packets of a communication service in the case of another type of HPS and transmit the data packets of the HPS to the NIC driver.

The at least one instruction may further include an instruction to allow the NIC driver, which transmits a packet of an HPS to a client and a device (an HMD), to transmit the HPS to a client by allocating a bandwidth of an NIC Ethernet port after applying a bandwidth agreed upon in advance with a user to a data packet of information corresponding to the HPS requested by the user.

Figure 18:
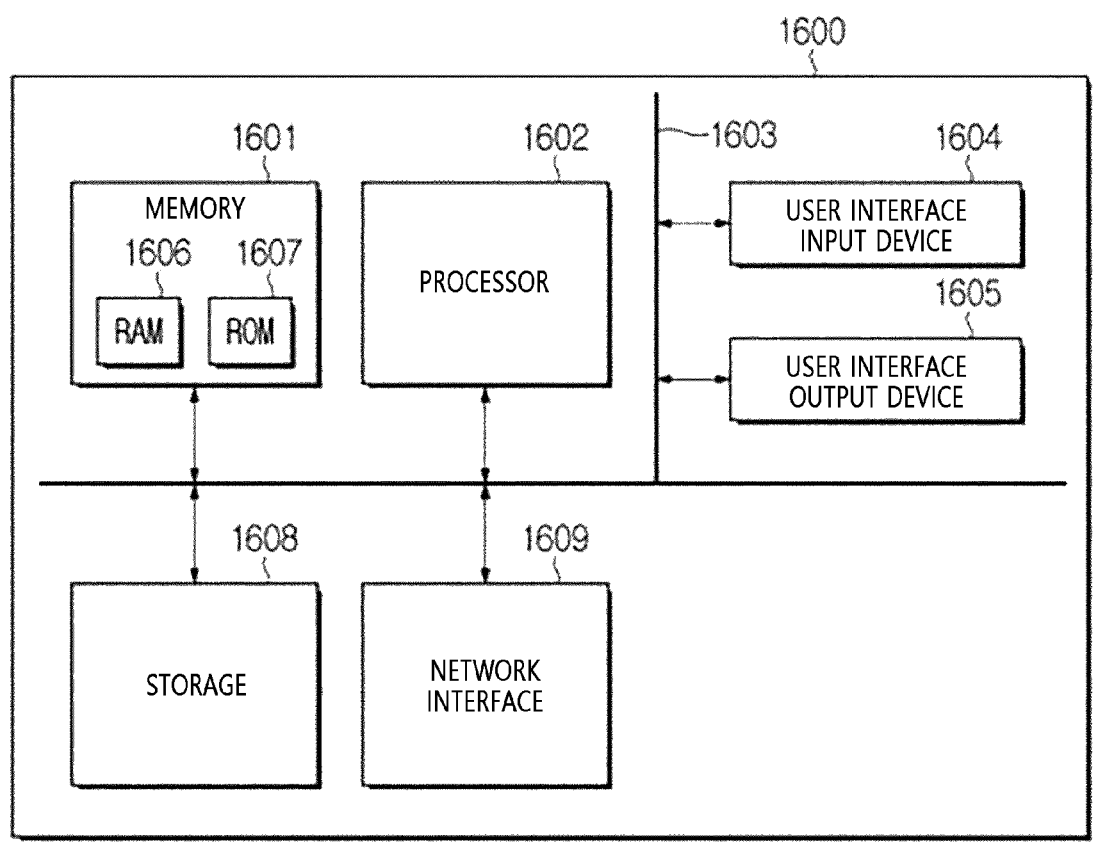
FIG. 18 is a block diagram illustrating a networking apparatus for providing an HPS according to an embodiment of the present disclosure.

FIG. 18 illustrates a configuration of an apparatus for providing the HPS according to an embodiment of the present disclosure. More specifically, FIG. 18 illustrates another example of a networking apparatus for performing a method of providing an HPS according to an embodiment of the present disclosure.

Referring to FIG. 18, a networking apparatus 1600 according to the embodiment of the present disclosure may include at least one processor 1602, a memory 1601, a user interface input device 1604, and a user interface output device 1605 that are connected through a bus 1603. The networking apparatus 1600 may further include a storage 1608 and a network interface 1609. However, based on a device design purpose, the storage 1608 and the network interface 1609 may be omitted in the configuration of the networking apparatus 1600.

Specifically, the networking apparatus 1600 of FIG. 18 may be the above-described user device or server device, and may be, for example, a user terminal, a smart phone, a laptop computer, a portable personal information device, or the like. In this case, for example, the memory 1601 may be a non-removable memory or a removable memory. For example, the processor 1602 may include at least one among a general-purpose processor, a digital signal processor (DSP), a DSP core, a controller, a microcontroller, application-specific integrated circuits (ASICs), field programmable gate array (FPGA) circuits, a different type of integrated circuit (IC), or one or more microprocessors related to a state machine.

For example, the processor 1602 may communicate with other devices through the network interface 1609. For example, the network interface 1609 may transmit radio-frequency (RF) signals through an antenna and transmit signals on the basis of various types of communication networks. Here, for example, multi-input multi-output (MIMO) technology, beamforming, or the like may be applied as antenna technology, but the present disclosure is not limited to the above-described embodiments. Signals transmitted and received through the network interface 1609 may be modulated or demodulated, and controlled by the processor 1602, but the present disclosure is not limited to the above-described embodiments.

For example, the user interface input device 1604 is used as a means for transmitting a user command to the processor 1602 or the user interface output device 1605.

To implement methods according to the present disclosure, additional operations may be added to operations provided as an example, some of the operations may be omitted and the rest are included, or some of the operations may be omitted and additional operations may be added.

Various embodiments of the present disclosure are intended to describe example aspects of the present disclosure rather than listing all possible combinations, and matters described in various embodiments may be applied independently or in combinations of two or more thereof.

In addition, various embodiments of the present disclosure may be implemented by hardware, firmware, software, or a combination thereof. In the case of implementation by hardware, various embodiments of the present disclosure may be implemented by at least one of ASICs, DSPs, digital signal processing devices (DSPDs), programmable logic devices (PLDs), FPGAs, a general-purpose processor, a controller, a microcontroller, a microprocessor, or the like.

The scope of the present disclosure includes software- or machine-executable instructions (e.g., an operating system, an application, firmware, a program, etc.) that cause operations of methods according to various embodiments to be performed by a device or a computer, and a non-transitory computer-readable medium storing such software or instructions to be executed by a device or a computer.

According to embodiments of the present disclosure, a user device or an HPS server of a user can provide a low latency and high bandwidth network processing rate to provide an HPS while continuously securing the quality thereof. In particular, the HPS can be provided within a desired end-to-end delay (e.g., within 20 ms), and therefore the quality thereof can be continuously secured even when URLLC service is provided. The HPS and/or the URLLC is applicable to telemedicine, remote robotic surgery, connected car, manufacture automation, a smart grid, VR, AR, MR, extended reality (XR), etc.

Effects of the present disclosure are not limited thereto, and other effects that are not described herein will be clearly understood by those of ordinary skill in the art to which the present disclosure pertains from the following description.

What is claimed is:

1. A networking method for data transmission in a host supporting quality assurance of an ultra-reliable and low latency communication (URLLC), comprising:
   receiving a request for an URLLC from a client;
   checking a descriptor of the URLLC in a quality-of-service (QoS) profile of the URLLC requested by the client and applying a performance parameter; and
   selecting an optimal algorithm suitable for a type of the URLLC requested by the client,
   wherein the optimal algorithm comprises a queue discipline (Qdisc) algorithm,
   wherein the Qdisc algorithm comprises PRIO, CBS, MQPRIO, TAPRIO, and TAPRIO+ETF.

2. The networking method of claim 1, wherein the descriptor of the URLLC in the QoS profile comprises a key performance indicator (KPI) required for the URLLC.

3. The networking method of claim 2, wherein the KPI required for the URLLC comprises at least one of a mean time between failures (MTBF), an end-to-end latency, service availability, a transmission bandwidth, a bandwidth bit rate, or a message size.

4. The networking method of claim 1, further comprising selecting an algorithm suitable for the type of the URLLC requested by the client from among PRIO, CBS, MQPRIO, TAPRIO, and TAPRIO+ETF, and transmitting the selected algorithm to the client after applying a bandwidth assigned according to a type of the client.

5. The networking method of claim 1, wherein the data transmission in the host is performed through socket communication using a kernel.

6. The networking method of claim 1, wherein a user datagram protocol (UDP) is applied for the data transmission in the host.

7. A networking apparatus in a host supporting quality assurance of an ultra-reliable and low latency communication (URLLC), comprising:
   a processor; and
   a memory storing at least one instruction to be executed by the processor,
   wherein, upon receiving a request for an HPS URLLC from a client, the processor checks a descriptor of the URLLC in a quality-of-service (QoS) profile matching a type of the client, applies a performance parameter, and selects an optimal algorithm suitable for a type of the URLLC requested by the client,
   wherein the optimal algorithm performed by the processor comprises a queue discipline (Qdisc) algorithm,
   wherein the Qdisc algorithm comprises PRIO, CBS, MQPRIO, TAPRIO, and TAPRIO+ETF.

8. The networking apparatus of claim 7, wherein the QoS profile matching the type of the client comprises a key performance indicator (KPI) required for the URLLC.

9. The networking apparatus of claim 8, wherein the KPI comprises at least one of a mean time between failures (MTBF), an end-to-end latency, service availability, a bandwidth bit rate, or a message size.

10. The networking apparatus of claim 7, further comprising an apparatus for a network transmission,
    wherein, when the processor selects and executes an algorithm suitable for the type of the UPS requested by the client from among PRIO, CBS, MQPRIO, TAPRIO, and TAPRIO+ETF, the network transmission device transmits the selected algorithm to the client after applying a bandwidth assigned according to a type of the client.

11. The networking apparatus of claim 7, further comprising a socket communication device using a kernel.

12. The networking apparatus of claim 7, further comprising a user datagram protocol (UDP) for data transmission.

13. A networking system supporting quality assurance of an ultra-reliable and low latency communication (URLLC), comprising:

a first edge node connected to a client; and a second edge node configured to provide content, wherein, upon receiving a request for an URLLC from a client, the first edge node checks a descriptor of the URLLC in a quality-of-service (QoS) profile according to a type of the client, applies a performance parameter, and selects an optimal algorithm suitable for a type of the URLLC requested by the client, and upon receiving the request for the URLLC from the first edge, the second edge node checks a descriptor of the URLLC in a QoS profile according to the type of the URLLC, applies a performance parameter, selects an optimal algorithm suitable for the type of the URLLC, and transmits content requested through the URLLC to the first edge node after applying the performance parameter, wherein the optimal algorithm comprises a queue discipline (Qdisc) algorithm, wherein the Qdisc algorithm comprises PRIO, CBS, MQPRIO, TAPRIO, and TAPRIO+ETF.

* * * * *